(12) United States Patent
Kucera et al.

(10) Patent No.: US 7,037,385 B2
(45) Date of Patent: *May 2, 2006

(54) AQUEOUS METAL TREATMENT COMPOSITION

(75) Inventors: Helmut W. Kucera, West Springfield, PA (US); Kirk J. Abbey, Garner, NC (US); Ernest B. Troughton, Jr., Raleigh, NC (US)

(73) Assignee: LORD Corporation, Cary, NC (US)

( * ) Notice: Subject to any disclaimer, the term of this patent is extended or adjusted under 35 U.S.C. 154(b) by 363 days.

This patent is subject to a terminal disclaimer.

(21) Appl. No.: 10/138,957

(22) Filed: May 4, 2002

(65) Prior Publication Data

US 2003/0075245 A1    Apr. 24, 2003

Related U.S. Application Data

(63) Continuation-in-part of application No. 09/235,201, filed on Jan. 22, 1999, now Pat. No. 6,383,307.

(60) Provisional application No. 60/072,782, filed on Jan. 27, 1998.

(51) Int. Cl.
*C23C 22/00* (2006.01)
*C23C 22/83* (2006.01)
*C08G 8/28* (2006.01)
*C09D 5/08* (2006.01)
*C09D 161/00* (2006.01)

(52) U.S. Cl. ............... 148/251; 148/259; 148/260; 106/14.12; 106/14.44; 106/14.45; 252/384; 252/393

(58) Field of Classification Search .......... 148/251, 148/259, 260; 106/14.12, 14.44, 14.45; 252/384, 252/393
See application file for complete search history.

(56) References Cited

U.S. PATENT DOCUMENTS

| | | | |
|---|---|---|---|
| 2,512,950 A | 6/1950 | Lendergran | |
| 3,258,388 A | 6/1966 | Coleman et al. | |
| 3,258,389 A | 6/1966 | Coleman et al. | |
| 3,519,493 A * | 7/1970 | Farone | ............ 428/470 |
| 3,920,600 A | 11/1975 | Ahramjian | |
| 3,931,083 A | 1/1976 | Sasaki et al. | |
| 4,027,055 A | 5/1977 | Schneble, Jr. | |
| 4,054,547 A | 10/1977 | Shimizu et al. | |
| 4,119,587 A | 10/1978 | Jazenski et al. | |
| 4,167,500 A | 9/1979 | Jazenski et al. | |
| 4,293,349 A | 10/1981 | Pedrazzini | |
| 4,414,350 A | 11/1983 | Hall | |
| 4,483,962 A | 11/1984 | Sadowski | |
| 4,920,176 A | 4/1990 | Jorgensen, Jr. | |
| 4,968,741 A | 11/1990 | Burroway et al. | |
| 4,994,521 A | 2/1991 | Broadbent | |
| 5,011,551 A | 4/1991 | Emeric et al. | |
| 5,036,122 A | 7/1991 | Auerbach et al. | |
| 5,061,523 A | 10/1991 | Shachat | |
| 5,093,203 A | 3/1992 | Mowrey et al. | |
| 5,122,566 A | 6/1992 | Burroway et al. | |
| 5,128,403 A | 7/1992 | Warren et al. | |
| 5,200,455 A | 4/1993 | Warren | |
| 5,200,459 A | 4/1993 | Weih et al. | |
| 5,268,404 A | 12/1993 | Mowrey | |
| 5,281,638 A | 1/1994 | Mowrey | |
| 5,300,555 A | 4/1994 | Weih et al. | |
| 5,427,863 A | 6/1995 | Siebert | |
| 5,496,884 A | 3/1996 | Weih et al. | |
| 5,500,460 A | 3/1996 | Ahmed et al. | |
| 5,616,635 A | 4/1997 | Patel | |
| 5,691,048 A | 11/1997 | Roberto et al. | |
| 6,130,289 A | 10/2000 | Kucera | |
| 6,383,307 B1 * | 5/2002 | Kucera et al. | ............ 148/251 |
| 6,476,119 B1 * | 11/2002 | Kucera et al. | ............ 524/541 |
| 6,902,766 B1 * | 6/2005 | Kucera | ............ 427/372.2 |
| 2003/0075245 A1 | 4/2003 | Abbey et al. | |

FOREIGN PATENT DOCUMENTS

| | | |
|---|---|---|
| GB | 2 317 177 A | 3/1998 |
| WO | WO 93/15154 | 8/1993 |
| WO | WO 97/07163 | 2/1997 |
| WO | WO 97/09127 | 3/1997 |
| WO | WO 99/37722 | 7/1999 |

* cited by examiner

Primary Examiner—Roy King
Assistant Examiner—Harry D. Wilkins, III
(74) Attorney, Agent, or Firm—Todd W. Galinski

(57) ABSTRACT

An aqueous metal surface treatment composition comprising the following ingredients:
(A) an aqueous dispersion of a phenolic resin that includes a reaction product of
  (i) a phenolic resin precursor;
  (ii) a modifying agent, comprising a hydrocarbyl moiety bonded to at least one functional moiety that enables the modifying agent to react with the phenolic resin precursor; and at least one ionic moiety comprising an ionizable sulfur or phosphorous group; and
  (iii) at least one multi-hydroxyphenolic compound; and
(B) optionally an acid where (iii) in (A) is optional where the reaction product contains two or more reactive phenolic methylol groups.

55 Claims, No Drawings

US 7,037,385 B2

AQUEOUS METAL TREATMENT COMPOSITION

This application claims benefit of U.S. provisional application Ser. No. 60/072,782, filed Jan. 27, 1998, and is a continuation-in-part of application Ser. No. 09/235,201 filed Jan. 22, 1999 now U.S. Pat. No. 6,383,307.

BACKGROUND

The present invention relates to an aqueous autodepositable composition that is useful as a metal surface treatment.

It is well-known that metal surfaces are subject to corrosive and chemical degradation. This degradation has been combated by the application of various treatments to the metal surface. Conversion coating of the metal surface is one such treatment. Conversion coating generally involves treating the surface with chemicals that form a metal phosphate and/or metal oxide conversion coating on the metal surface. The conversion coating provides protection against corrosion and can enhance adhesion of any subsequent coatings. Phosphatizing is a well-established conversion process. However, phosphatizing suffers from several drawbacks. It is a complex multistep process that is capital intensive, requires close monitoring and can generate significant amounts of waste sludge. In addition, phosphatizing requires oxidative accelerators that promote corrosion and thus must be removed by multiple rinsing steps. Conventional inorganic phosphate conversion coatings are also very brittle and thus can fracture. A seal coat also is typically applied for good corrosion resistance that often includes hexavalent chrome which presents considerable environmental problems.

It is also generally known that the corrosion resistance of metal substrates can be improved by coating the substrate with an autodeposition composition that generally comprise an aqueous solution of an acid, an oxidizing agent and a dispersed resin. Immersion of a metallic surface in an autodeposition composition produces what is said to be a self-limiting protective coating on a metal substrate. The general principles and advantages of autodeposition are explained in a multitude of patents assigned to Parker Amchem and/or Henkel (see, for example, U.S. Pat. Nos. 4,414,350; 4,994,521; 5,427,863; 5,061,523 and 5,500,460).

U.S. Pat. No. 5,691,048 includes phosphoric acid in a list for possible acids in an autodepositing composition, but hydrofluoric acid is the preferred acid. This patent also lists hydrogen peroxide, chromic acid, potassium dichromate, nitric acid, sodium nitrate, sodium persulfate, ammonium persulfate, sodium perborate and ferric fluoride as possible oxidizing agents. Hydrogen peroxide and ferric fluoride are preferred.

Phosphatizing is also a well-known conversion treatment for providing corrosion resistance to metal surfaces. U.S. Pat. No. 5,011,551 relates to a metal conversion coating composition that includes an aliphatic alcohol, phosphoric acid, an alkali nitrate, tannic acid and zinc nitrate. U.S. Pat. No. 4,293,349 relates to a steel surface protective coating composition that includes pyrogallic acid glucoside, phosphoric acid, phosphates of bivalent transition metals such as Zn or Mn, Zn or Mn nitrate, and, optionally, formaldehyde.

An environmentally acceptable, user-friendly metal treatment with superior corrosion resistance and fracture toughness would be very desirable.

SUMMARY

An aqueous metal surface treatment composition comprising the following ingredients:
(A) an aqueous dispersion of a phenolic resin that includes a reaction product of
 (i) a phenolic resin precursor;
 (ii) a modifying agent, comprising a hydrocarbyl moiety bonded to at least one functional moiety that enables the modifying agent to react with the phenolic resin precursor; and at least one ionic moiety comprising an ionizable group containing sulfur or phosphorous,
 (iii) at least one multi-hydroxyphenolic compound; and
(B) optionally an acid, wherein (iii) is optional in (A) when said reaction product (A) contains two or more reactive phenolic methylol groups. In an autodepositable metal treatment, the aqueous dispersion comprises a (1) phenolic novolak resin and (2) a reaction product in which a phenolic resin precursor is reacted with a modifying agent that includes at least one functional moiety that enables the modifying agent to react with the phenolic resin precursor and at least one ionic moiety, (3) optionally an acid and, optionally, (4) a flexibilizer. According to one embodiment the modifying agent comprises an aromatic hydrocarbyl moiety. According to another embodiment, the ionic moiety of the modifying agent is sulfonate, sulfinate, or sulfenate group, and the dispersed phenolic resin reaction product has a carbon/sulfur atom ratio preferably from 20:1 to 200:1.

The phosphorous ionic moieties of the modifying agent comprise a phosphorous-containing group, including, for example, phosphono, —P(O)(OH)$_2$; phosphono ester —P(O)(OH)(OR); phosphonomethyl, —CH$_2$P(O)(OH)$_2$; phosphino, —P(O)(OH); and phosphinomethyl, —CH$_2$P(O)(OH).

In still further embodiments, the ionic moiety of the modifying agent comprises an activated carboxylic acid group. An activated carboxylic group contains α,α-halo substitution and the acid is sufficiently ionized to result in a stable dispersion over the pH range of 1–3, typically encountered in a autodeposition metal treatment, as taught herein.

The metal treatment composition preferably is applied to electrochemically active metals such as steel. This treatment improves adhesion of subsequent coatings such as primers and adhesives to the metal surface and it improves corrosion resistance. Since this treatment requires only a minimum number of coatings—typically less than three and often only a single coating—it is much more user friendly than conventional phosphatizing and eliminates the need for a seal coat. In addition, the metal treatment generally does not require any rinsing steps subsequent to application of the metal treatment composition. A unique feature of the invention is that the metal treatment composition is autodepositable.

It has also been discovered that metal substrates treated with the compositions of this invention may require sitting at ambient conditions (approximately 25° C.) for an extended time period after autodepositing and drying (approximately 2 to 24 hours after drying) and prior to application of a subsequent coating of a different composition. This intermediate time period is referred to herein as the "ambient staging period". Without this ambient staging period the corrosion resistance of the final product was inconsistent for certain demanding commercial applications. In addition, formation of a uniformly thick metal treatment coating is required for superior corrosion resistance. Too thin or too thick a coating also can be detrimental to corrosion protection.

Addition of a control agent to autodeposition compositions has been found to dramatically improve uniform coating formation on more complex surface topography and enhance the autodeposition of subsequently-applied compositions thus improving corrosion resistance and overall robustness. The protective coating formed by the composition of the invention is particularly useful for providing corrosion resistance to metal substrates that are subjected to significant stresses and/or strains causing significant flexing or movement of the substrate surface. Due to the improved deposition caused by the control agent, the concentration of active ingredients in an autodepositable composition that includes the control agent can be reduced. Another advantage of the invention is that there is no need to post-rinse the treated surface in order to remove any control agent residue. Furthermore, the control agent eliminates or substantially eliminates the ambient staging period thus improving process efficiency.

Accordingly, a further embodiment of the invention provides an aqueous autodeposition composition that includes an autodepositable component and a control agent, preferably an organic nitro material. The autodepositable component preferably is an aqueous phenolic resin dispersion, particularly the aqueous novolak dispersion mentioned above. The autodeposition composition is particularly useful as a metal treatment composition that also includes an acid, especially phosphoric acid.

According to another embodiment of the invention there is provided a method for treating a metal surface that includes applying to the surface an aqueous autodeposition composition that includes an autodepositable component and the control agent.

DETAILED DESCRIPTION

Unless otherwise indicated, description of components in chemical nomenclature refers to the components at the time of addition to any combination specified in the description, but does not necessarily preclude chemical interactions among the components of a mixture once mixed.

Certain terms used in this document are defined below.

"Primer" means a liquid composition applied to a surface as an undercoat beneath a subsequently-applied covercoat. The covercoat can be an adhesive and the primer/adhesive covercoat forms an adhesive system for bonding two substrates together.

"Coating" means a liquid composition applied to a surface to form a protective and/or aesthetically pleasing coating on the surface.

"Phenolic compound" means a compound that includes at least one hydroxy functional group attached to a carbon atom of an aromatic ring. Illustrative phenolic compounds include unsubstituted phenol per se, substituted phenols such as alkylated, alkoxy-phenols, chloro-phenols, and multi-hydroxy phenols, and hydroxy-substituted multi-ring aromatics, e.g. phenolic novolak, and phenolic resoles. Illustrative alkylated phenols include methylphenol (also known as cresol), dimethylphenol (also known as xylenol), 2-ethylphenol, pentylphenol and tert-butyl phenol. "Multi-hydroxy phenolic compound" means a compound that includes more than one hydroxy group on each aromatic ring. Illustrative multi-hydroxy phenols include 1,3-benzenediol (also known as resorcinol), 1,2-benzenediol (also known as pyrocatechol), 1,4-benzenediol (also known as hydroquinone), 1,2,3-benzenetriol (also known as pyrogallol), 1,3,5-benzenetriol and 4-tert-butyl-1,2-benzenediol (also known as tert-butyl catechol). Illustrative hydroxy-substituted multi-ring aromatics include 4,4'-isopropylidenebisphenol (also known as bisphenol A), 4,4'methylidenebisphenol (also known as bisphenol F) and naphthol.

"Aldehyde compound" means a compound having the generic formula RCHO. Illustrative aldehyde compounds include formaldehyde, acetaldehyde, propionaldehyde, n-butylaldehyde, n-valeraldehyde, caproaldehyde, heptaldehyde and other straight-chain aldehydes having up to 8 carbon atoms, as well as compounds that decompose to formaldehyde such as paraformaldehyde, trioxane, furfural, hexamethylenetriamine, acetals that liberate formaldehyde on heating, and benzaldehyde.

"Phenolic resin" generally means the reaction product of a phenolic compound with an aldehyde compound. The molar ratio of the aldehyde compound (for example, formaldehyde) reacted with the phenolic compound is referred to herein as the "F/P ratio". The F/P ratio is calculated on a per hydroxy-substituted aromatic ring basis.

"Phenolic resin precursor" means an unmodified or conventional phenolic resin that is reacted with the modifying agent to produce the phenolic resin that is dispersed in an aqueous phase.

"Electrochemically active metals" means iron and all metals and alloys more active than hydrogen in the electromotive series. Examples of electrochemically active metal surfaces include zinc, iron, aluminum and cold-rolled, polished, pickled, hot-rolled and galvanized steel.

"Ferrous" means iron and alloys of iron.

The term "hydrocarbyl moiety" refers to an organic moiety which is aromatic, aliphatic or a combination of aromatic and aliphatic moieties, and optionally containing O, N, S and/or P as a substituents, or components intervening in the parent chain or backbone of the structure.

The term "aryl" when used alone refers to an aromatic radical or group, whether or not fused. Exemplary aryl groups include phenyl, naphthyl, biphenyl, and the like. "Heteroaromatic" groups include, but are not limited to, furanyl, pyrrolyl, thienyl, pyrazolyl, thiazolyl, oxazolyl, pyridyl, pyrimidinyl, indolyl, and the like.

The term "substituted aryl" denotes an aryl or heteroaryl group substituted in any one (e.g. 1, 2, 3, 4, 5, etc.) or more available sites on a ring, and include independently chosen substituents, such as halogen, cyano, nitro, $C_1$–$C_{10}$ alkyl, $C_1$–$C_{10}$ alkylol, $C_1$–$C_{10}$-alkyloxy, $C_1$–$C_{10}$-oxyalkyl, $C_1$–$C_{10}$-carboxylic acid, $C_1$–$C_{10}$ sulfonic acid, $C_1$–$C_{10}$-carboxylic ester, $C_1$–$C_{10}$-caboxylic amide, trifluoromethyl, alkyloxycarbonyl, and the like. Examples of such groups are 4-chlorophenyl, 2-methylphenyl, 3-ethoxyphenyl, and orthomethylol.

The term "arylalkyl" means one or more aryl groups having a designated number of carbons, substituted on a hydrocarbyl radical or moiety. Exemplary arylalkyl groups are $C_6$–$C_{30}$ aryl substituents on a $C_1$–$C_{20}$ or $C_1$–$C_{10}$ alkyl radical. An exemplary arylalkyl group is a benzyl group, tolyl group, xylyl group, and a 2-ethylhexyl phenyl.

The term "alkenyl" refers to a straight or branched chain group of from two to ten carbon atoms containing a carbon-carbon double bond, including, but not limited to allyl, vinyl, and the like.

While not wishing to be bound to any particular theory, it is believed that the metal treatment of this invention is based on the principle of autodeposition. Autodeposition is useful in the control of film thickness. In some embodiments, effective metal treatment is provided by contacting a metal surface without autodeposition, leaving an effective metal treatment composition upon removal of water. When the treatment composition is applied to an electrochemically active metal in an acidic autodepositable preparation, the acid reacts with the metal to form multivalent ions (for example, ferric and/or ferrous ions in the case of steel) that appear to cause the rate of deposition on the metal surface to be self-limiting, i.e., rate decreasing over time, to leave a substantially uniform, gelatinous, highly acidic wet film. As the film dries (the drying can be accelerated by heating) the remaining phosphoric acid converts the surface to the respective metal compound with the respective negative ion of the acid (for example, metal phosphate in the case of phosphoric acid) forming an interpenetrating network with chelating groups of the aqueous dispersed phenolic novolak resin (A). The coating that is formed when the composition is in contact with the metal surface is known as the "unconverted" state. The subsequent drying of the coating converts the coating to a "converted" state. The formation of the coating is substantially "self-limiting" in that the coating increases in thickness and areal density (mass per unit area) the longer the time the metallic substrate is immersed in the metal treatment composition. The rate of thickness and areal density increase, however, decreases rapidly with immersion time.

The autodeposition characteristic of the invention is important to provide corrosion resistance. It allows for the formation of an exceptionally uniform film. Excellent corrosion resistance is possible only if the entire surface of a metal part is protected with a barrier coating. This requirement is usually difficult to achieve on substrate surfaces that have very complex topology. With the superior autodeposition of this invention, wetting and thus protection of such complex surfaces is achieved. A further advantage of the metal treatment is that it can activate a metal surface for autodeposition of a subsequently applied coating or primer that includes a dispersed phenolic resin as described above. Such a primer is described in more detail in commonly-owned U.S. patent application Ser. No. 09/235,778 filed Jan. 22, 1999, entitled "Aqueous Primer or Coating".

Another important advantage of the metal treatment composition is that a bath of the composition does not appear to change in composition as cumulative metal surfaces are dipped in the bath over a period of time. It is believed that since the very hydrophilic phenolic resin dispersion immobilizes or coagulates on the metal surface as a swollen wet gel rather than a precipitate, the composition of the bath is the same as the deposited wet gel and the bath is not depleted. In addition, it appears that there is substantially no build-up of ferrous/ferric ions in the bath.

In one embodiment the metal treatment composition contains an aqueous dispersed modified phenolic novolak resin (A). In other embodiments the dispersed phenolic is a modified resole, as illustrated below. The modified phenolic resole contains one or more sulfonomethyl groups, and one or more methylol groups attached to the same aromatic ring. These copending methylol groups are deactivated and this resole forms a stable acidic dispersion and will cure on application of heat. The modified phenolic novolak, or resole, or combinations thereof, or each or both in combination with other phenolic resins are responsible for the autodeposition characteristic of the metal treatment composition. The phenolic novolak resin dispersion (A) of the inventive composition can be obtained by initially reacting or mixing a phenolic resin precursor and a modifying agent—theoretically via a condensation reaction between the phenolic resin precursor and the modifying agent. It should be recognized that conventional resole resins cannot be used in or formulated into the metal treatment composition due to the presence of the acid. Under the acidic conditions of the metal treatment conventional resoles are unstable and can advance quickly to gellation at which point the system cannot form a film. The parasulfonomethyl resole embodiments according to the invention are surprisingly stable under acidic conditions.

One functional moiety of the modifying agent provides the ionic pendant group that enables stable dispersion of the phenolic resin. Since the ionic pendant group provides for the stability of the dispersion there is no need, or at the most a minimal need, for surfactants. The presence of surfactants in an aqueous composition is a well-known hindrance to the composition's performance.

The other important functional moiety in the modifying agent enables the modifying agent to react with the phenolic resin precursor. The modifying agent can contain more than one ionic pendant group and more than one reaction-enabling moiety.

Incorporation of aromatic sulfonate functional moieties into the phenolic resin structure via condensation is the preferred method of providing the ionic pendant groups. Accordingly, one class of ionic moieties are substituents on an aromatic ring that include a sulfur atom covalently or ionically bonded to a carbon atom of the aromatic ring. Examples of covalently bound sulfur-containing substituents are the acid forms and salts, e.g., sulfonate (—S(O)$_2$H,) and salts (—S(O)$_2$O$^-$M$^+$), sulfinate (—S(O)OH) and salts (—S(O)O$^-$M$^+$), and sulfenate (—SOH) and salts (—SO$^-$M$^+$), wherein M can be any monovalent ion such as Na$^+$, Li$^+$, K$^+$, or NR$^1_4$ (wherein R$^1$ is independently, hydrogen or alkyl, e.g., C$_1$–C$_6$ alkyl). Another example of a covalently bound substituent is sulfate ion.

Sulfonate is the preferred ionic group. Generally, the modifying agent should not include or introduce any multivalent ions into the phenolic resin dispersion since it is expected that the presence of multivalent ions would cause the phenolic resin to precipitate rather than remain dispersed.

The modifying agent comprises a hydrocarbyl moiety that contains at least one ionic moiety and at least one group reactive with an active hydrogen ortho or para to phenolic OH, or reactive with a methylol group to form a bond with the phenolic resin precursor. A reaction product of the modifying agent and phenolic precursor includes self curing embodiments, and embodiments which are further reacted with at least one multi-hydroxyphenolic compound. Metal treatments comprising the reaction product of itself in the case of self-curing modifying agents. The hydrocarbyl moiety can contain atoms other than C and H, as substituents or as intervening groups, or a combination of substituent and intervening groups. A general depiction of a modifying agent is represented in the following figures where "ionic" is the ionic group specified herein, "link" is a group that covalently bonds to a phenolic, and "x" denotes an oxygen-, nitrogen-, sulfur-, or phosphorous-containing group as a substituent in FIG. A or as an intervening group in FIG. B:

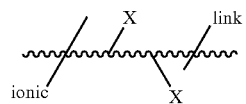

FIG. A

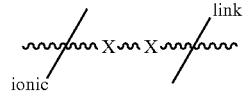

FIG. B

Not depicted above is the included alternative where both intervening and substituents groups are present in the hydrocarbyl moiety. Representative X groups are O, S, N, acyl-N, tertiary N-alkyl, ether, thioether, sulfoxide, sulfone, phosphine, phosphine oxide, ureido, alkylated ureido, amide, and alkylated amide. Intervening X groups can be repeating units, e.g. polyethers segments.

The hydrocarbyl moiety comprises either (i) a $C_1$–$C_{20}$ linear or branched, substituted and unsubstituted aliphatic hydrocarbon, (ii) $C_7$-C preferably C7-$C_2$ aliphatic hydrocarbons, (ii) $C_6$–$C_{18}$ mononuclear-, (iii) $C_{12}$–$C_{30}$ multinuclear- and $C_{10}$–$C_{30}$ fused aromatic compounds. Examples of fused aromatic hydrocarbyl moieties as modifying agents are DHNS, and sultam acid, i.e., 1,8-naphthosultam-2,4-disulfonic acid—$C_{10}H_4(SO_3H)_2NHSO_2$. The hydrocarbyl moiety can include heteroaromatic groups. The modifying agent includes, at least one ionizable sulfur, and/or phosphorous, and/or activated carboxylic acid group, which is sufficiently ionized to form a stable dispersion at a acidic pH (1–7), especially in a pH of 1–3 when the metal treatment compositions are desiredly applied to a metal surface by autodeposition.

The ionizable sulfur-containing ionic moieties include, for example, a group bearing a sulfonyl (—$SO_2$—), sulfinyl (—SO—), sulfonate, (—$S(O)_2O^-M^+$), sulfinate (—$S(O)O^-M^+$), and sulfenate (—$SO^-M^+$) groups. More particularly, it can be, for example, a sulfonoalkyl group (—R—$S(O)_2O^-M^+$) wherein R represents a $C_1$–$C_{12}$-alkyl or -alkylene group, such as, for example, a sulfonomethyl group (—$CH_2$—$S(O)_2O^-M^+$), wherein $M^+$ represents a monovalent ion such as, for example, sodium, lithium, potassium, or ammonium. Unless otherwise indicated in this disclosure, one skilled in the art understands that the monovalent ion can be converted between different metals and the acid, protonic form by ion exchange methods known in the art.

There are several known synthesis methods which can be utilized to make compounds that are suitable modifying agents used in accordance with the present invention. The modifying agent contains at least one ionic group, and at least one reaction-enabling group reactive with a phenolic resin or phenolic resin precursor. One example of a specific modifying agent is the sodium salt of 2,6-bis-(hydroxymethyl)-4-sulfonomethyl-phenol (BHSP). This monomer is also useful as a condensate, which is a linear sulfonomethylphenol oligomer or polymer formed on heating as illustrated in FIG. 1.

In FIG. 1, n equals any number of repeating units, and arbitrarily is from 1–50 in reference to an oligomer, or n=51–500 in reference to a "polymer". Oligomers are preferred. The condensate is expected to comprise a distribution of oligomers of varying number of repeating units, and is water-dispersible over a broad range of molecular weight.

The sulfonomethyl phenol oligomer is useful for formulating into an aqueous autodepositable dispersion. Alternatively, the sulfonomethyl phenol oligomer is useful by itself as an aqueous metal treatment. This ionic stabilized resole is uniquely stable under acidic conditions, and will cure on heating in combination with a phenolic, e.g. resorcinol, or a novolak having multiple reactive sites. A condensate formed form the reaction of the sulfonomethyl phenol oligomer and another phenolic having more than one reactive site is self-curing, and is useful as a 1-coat metal treatment. The condensate can be combined with a phenolic precursor, phenolic novolak, or phenolic which is modified according to the present invention In but another embodiment, the linear sulfonomethyl phenol monomer or oligomer is co-condensed with a phenolic precursor, or a novolak resin and formulated into an autodepositable dispersion in accordance with the invention. In yet another alternative embodiment the sulfonomethyl phenol monomer or oligomer can be physically blended with a phenolic resin in an autodepositable aqueous dispersion and upon deposition and subsequent heating, forms a co-condensate with the phenolic resin.

Another exemplary method for preparing modifying agents having sulfonomethyl groups is to react a phenolic compound having hydroxylmethyl groups (—$CH_2OH$) such as a phenolic resole with a sulfonomethylation agent such as, for example, $Na_2SO_3$ or $NaHSO_3$ as illustrated in FIG. 2. Para substitutions are included. Substitution of a sulfonomethylating agent at the ortho position is preferred.

Another example embodiment is the reaction of a novolak with either (i) a sulfonomethylation agent such as, for example, $Na^+CH_2SO_3^-$, or (ii) a sulfonomethylation agent such as $Na_2SO_3$ or $NaHSO_3$ in combination with an aldehyde source such as formaldehyde as illustrated in FIG. 3. Examples of a starting phenolic include the phenolic pre-

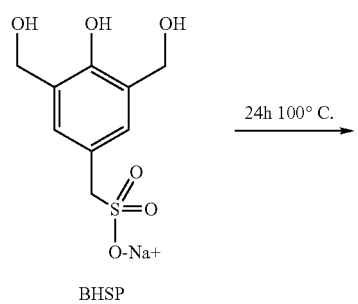

FIG.1

BHSP cursors, such as resorcinol, catechol, pyrogallol, phorglucinol, and carboxyl-, carboxy ester-, and carboxy amide derivatives of phenolic precursors, which are commonly available.

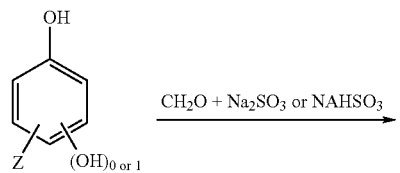

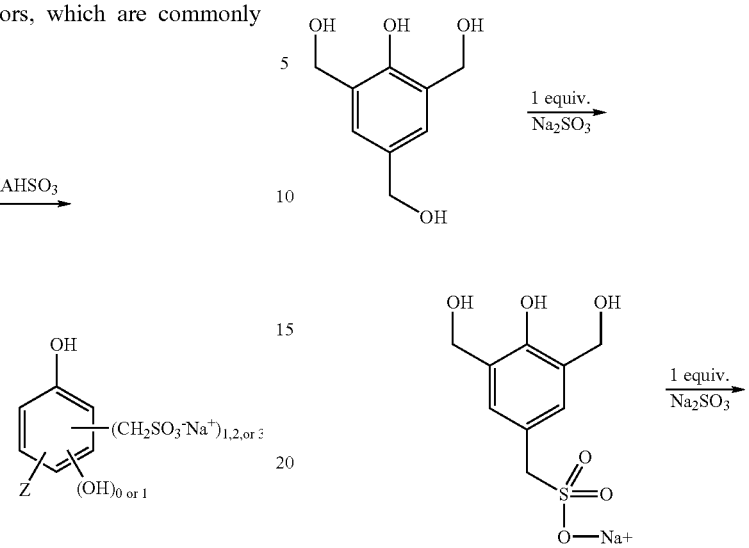

FIG. 5 wherein Z=OH, H, phenolic, carboxylic acid, carboxylic ester or carboxylic amide with the proviso that at least one active H remains ortho or para to a phenolic OH; and when three sulfonomethyl groups are present on the ring, Z must be phenolic.

Still further, another example of a preparation for the modifying agent is to react a methylolated sulfonomethyl compound such as, for example, a salt of BHSP with a phenolic resin such as, for example, a novolak, as illustrated in FIG. 4.

FIG. 4

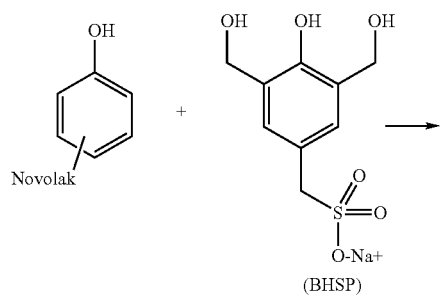

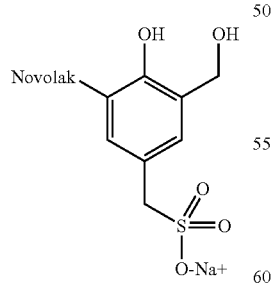

This reaction can be carried out in water at reflux. The temperature of the reaction is an important parameter. For example, using reflux conditions in water, the reaction is completed within a few hours and one obtains a mix of ortho and para substituted sulfonomethylphenols as shown in FIG. 5. However, to obtain selective para-sulfonomethylation of methylolated phenols like TMP, the temperature should be kept below 60° C. Otherwise, both ortho and para-substituted products are formed instead of the exclusive formation of the para-substituted product.

In addition, phenolic compounds can be sulfonomethylated. In general, any position ortho or para to a phenolic hydroxy group can be converted to an ionic group, e.g. a sulfonomethylated group as illustrated in FIG. 6 where L=—SO$_3$). The wave lines represent remainder oligomer segments not shown.

In another example, the modifying agent also can be prepared starting from 4-hydroxybenzylalcohol or 2,4,6-tri(hydroxymethyl)phenol or from sulfonomethylated derivatives as illustrated in FIG. 5 (showing TMP, 2,4,6-tri(hydroxymethyl)phenol).

FIG. 6

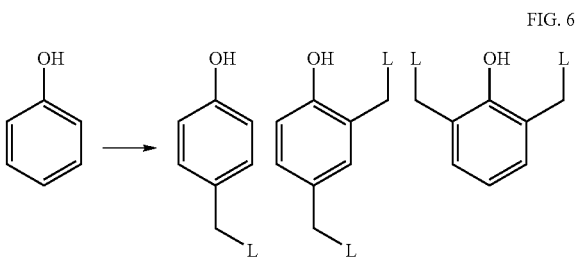

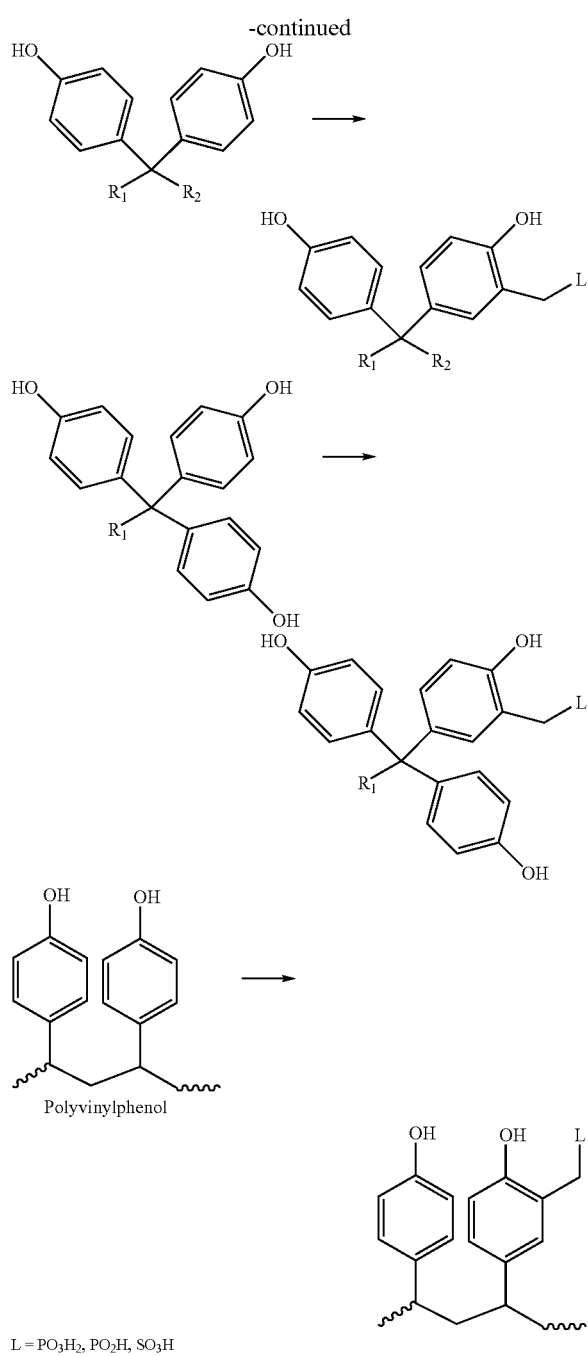

L = PO₃H₂, PO₂H, SO₃H

Multi-hydroxy phenols as depicted in FIG. 3 and in some cases hydroxymethyl-substituted phenols can be used. At least one reactive site, however, should be available to enable reaction of the modifying agent with the phenolic resin precursor to form the dispersion. The reactive site can be, for example, an active hydrogen ortho or para to a phenolic hydroxy group. In FIG. 6, the $R_1$ and $R_2$ groups are, independently, hydrogen or organic radicals such as alkyl, aryl, arylalkyl, or a phenolic novolak. Preferred examples include hydrogen, methyl, ethyl, and phenolic novolaks. Reagents for converting a novolak to the sulfonomethyl substituted product include 1) reaction with a formaldehyde source and either sodium bisulite, and sodium hydrosulfite, or (2) reaction with a sulfonomethylated resole.

Alternatively a novolak can be reacted with a formaldehyde source to make a conventional resole. Any resole can be reacted with an alkyl phosphite, preferably a trialkylphosphite, e.g., trimethyl phosphite, to give a phosphonate ester group which when followed by hydrolysis gives the desired novolak with phosphonic acid or monoesterphosphonic acid groups.

Representative aliphatic structures include sulfonate-aldehyde structures as illustrated in FIG. 8 (1–5).

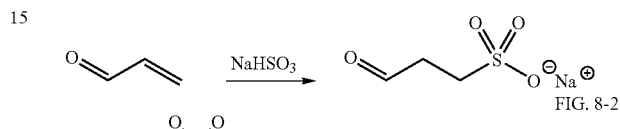

FIG. 8-1

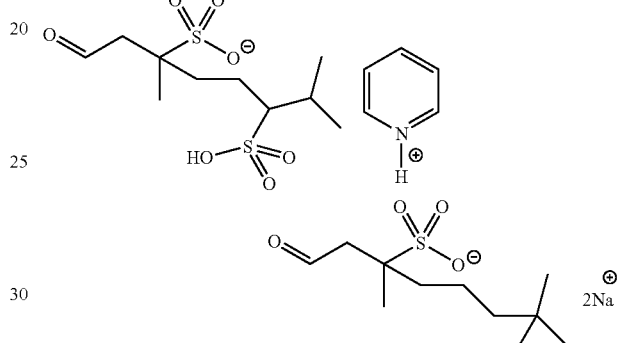

FIG. 8-2

FIG. 8-3

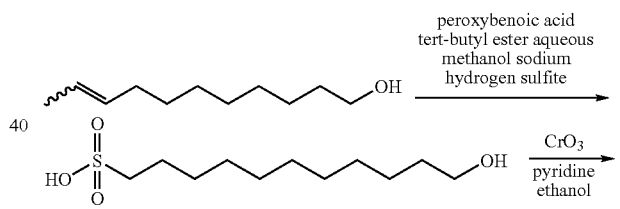

FIG. 8-4

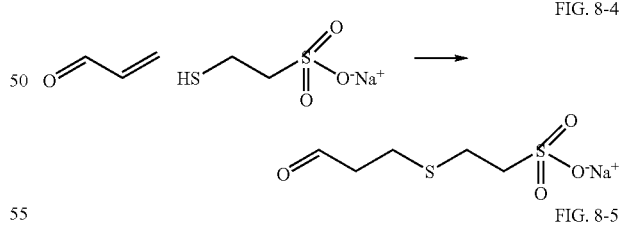

FIG. 8-5

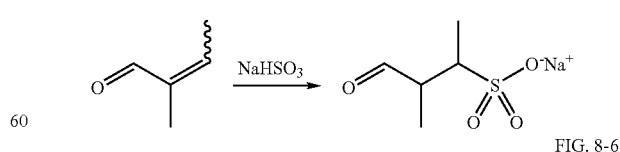

FIG. 8-6

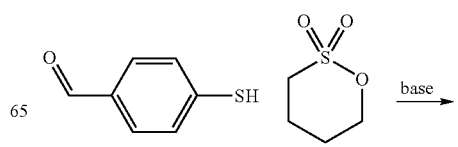

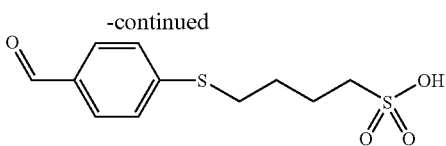

FIG. 8-7

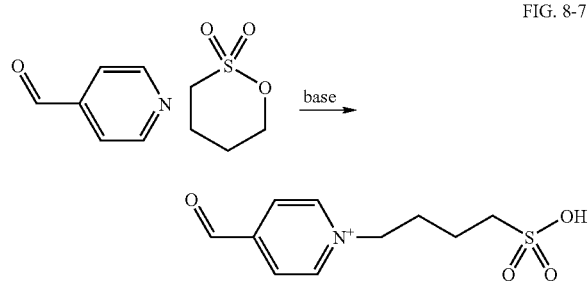

FIG. 8-8

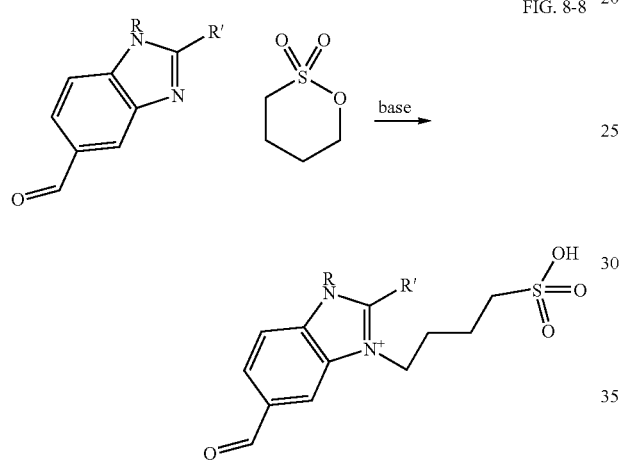

The following references describe synthetic routes corresponding with the numbers in series FIG. 8:
1) Willems, *Bull. Soc. Chim Belg.,* 64, 409, 425 (1955). Finch, H. D., *J. Org. Chem.,* 27, 649–651 (1962).
2) Johnson, T. J., Jones, R. A., *Tetrahedron,* 34, 547–551 (1978).
3) Vareri, F. S. et al., *Monatsh. Chem.,* 120, 967–972 (1989).
4) Brock, N. et al., *Arzneim. Forsch,* 29, 659–661 (1979).
5) Backer; van der Veen, *Recl. Trav. Chim. Pays-Bas,* 55, 897 (1936).

As mentioned, the modifying agent can contain other functional groups, e.g., oxygen, nitrogen, non-ionizable sulfur groups, and the like, for example, a nitrogen-containing sulfonate compound such as a sulfonate-amide, -amine, -imine, or -urea compound as illustrated in series FIGS. 9. The modifying agents include aliphatic or aromatic nitrogen-containing compounds which contain an ionic group, wherein nitrogen-containing functional groups provide reactive hydrogen as the reaction enabling moiety. In series FIGS. 9, various sultones are shown in reaction with an aliphatic amide (9-1) with base, and a urea with base (9-5). Guanidine (9-2), thiourea (9-3), or thiosemicarbazide (9-4) react spontaneously with sultones to make sulfonated derivatives. Sultones having 4, 5, 6, 7 or 8 membered rings react analogously to couple with such nitrogen compounds, leaving a remaining phenolic-reactive hydrogen on the nitrogen group. Exemplary known reagents containing amide-, imine-, amine-, urea-, amidine-, guanidine-, semicarbazide-, hydrazide-, thiohydrazide-, thioamide-, thiourea-, thiosemicarbazide-, carbamate-, thiocarbamate-, dithiocarbamate-, and isothiourea groups are useful in ring-opening coupling with a sultone to make sulfonated amides, sulfonated imines, sulfonated amines, sulfonated ureas, sulfonated amidines, sulfonated guanidine, sulfonated semicarbazides, sulfonated hydrazides, sulfonated thiohydrazides, sulfonated thioamides, sulfonated thioureas, sulfonated thiosemicarbazides, sulfonated carbamates, sulfonated thiocarbamates, sulfonated dithiocarbamates, and sulfonated isothioureas. Reactions in series 9-3 to 9-5 are made by methods analogous to those in 9-1 and 9-2. Reactions 9-6 utilizes 2-aminoethyl sulfonic acid. Correspondingly an 3-aminopropyl sulfonic acid could be used. Sulfonic acid structures as shown, are understood to be readily converted to corresponding sulfonate structures.

FIG. 9-1

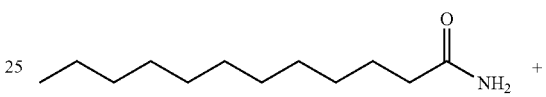

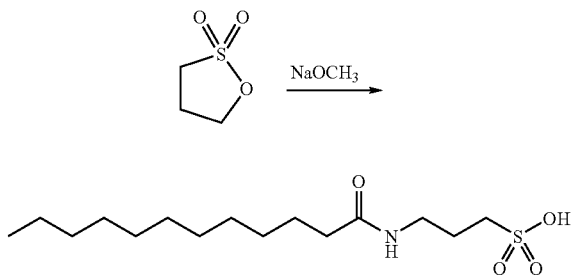

FIG. 9-2

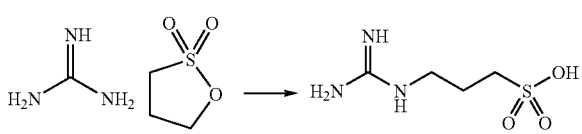

FIG. 9-3

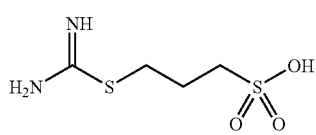

FIG. 9-4

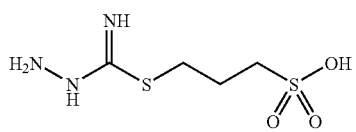

FIG. 9-5

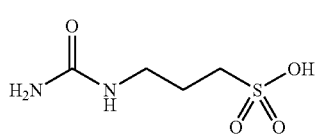

-continued

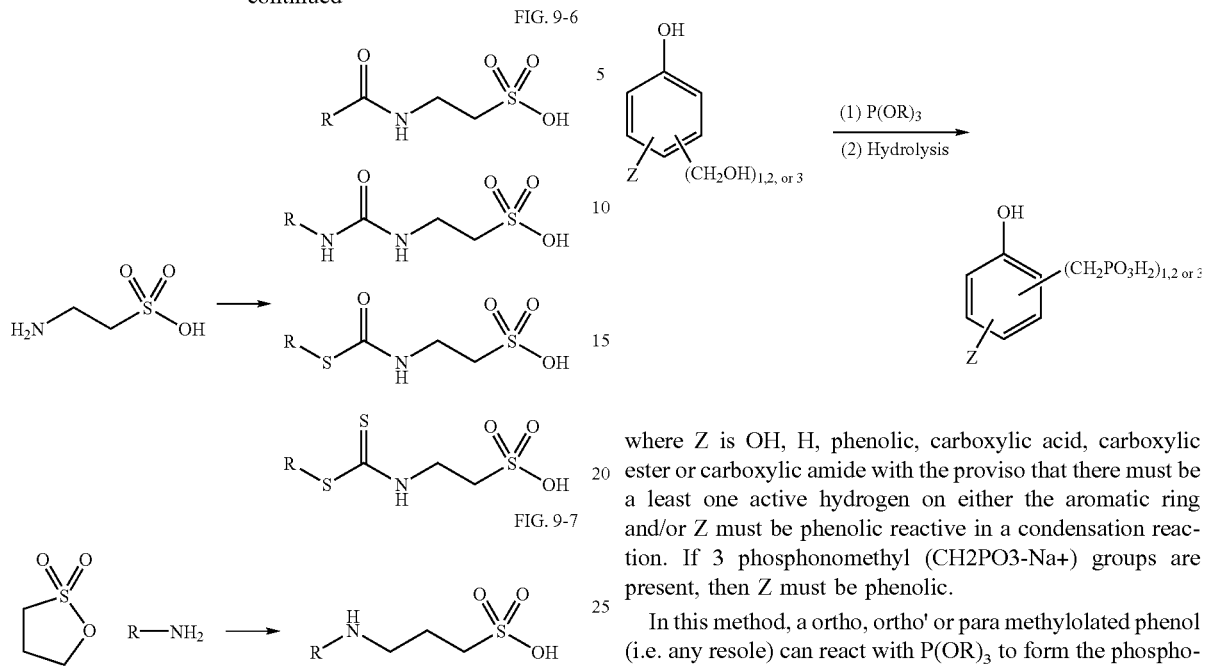

FIG. 9-6

FIG. 9-7

In the above FIGS. 9-6 and 9-7, R is H or $C_1$–$C_{10}$ substituted or unsubstituted, linear or branch alkyl groups, $C_6$–$C_{30}$ aryl, and $C_6$–$C_{30}$ aryl substituted $C_1$–$C_{10}$ alkyl groups.

Another route starts with an amine which is reacted with carbon disulfide, followed by addition of a sultone to make a sulfonated dithiocarbamate.

The following references describe synthetic routes to these structures and correspond to the reference numbers in series FIGS. 9:
1) Suga, K. et al., *Aust. J. Chem.*, 21, 2333–2339 (1968).
2) Fujii, A.; Cook, E. S., *J. Med. Chem.*, 18, 502–505 (1975).
   Mozolis et al., *Mokslu Adad. Darb. Ser. B.*, 4, 77, 80 (1976)
3) U.S. Pat. No. 2,833,781 (1954).
   Schramm, et al., *J. Am. Chem. Soc.*, 77, 6231 (1955).
4) Johnston, T. P.; Stringfellow, C. R., *J. Med. Chem.*, 9, 921–924 (1966).
5) Zeid, I. et al., *Justus Liebigs Ann. Chem.*, 761, 118–120 (1972).
   Zeid, I, *Chem. Ind.* (*London*), 380 (1973).
   Schoeberl et al. *Justus Liebigs Ann. Chem.*, 614, 83, 94 (1958).

If sulfonic acid structures are shown, it is understood that they can be converted to corresponding sulfonate structures.

Phosphorous-containing ionic moieties include, for example, salts of phosphono (—P(O)(O)$_2$$^{2-}$M$_1$$^+$M$_2$$^+$), phosphonoester (—P(O)(OR)O$^-$M$_1$$^+$), and phosphino (—P(O)O$^-$M$_1$) groups, wherein M$_1$ and M$_2$ each and independently represent monovalent ions, and R represents an organic radical. Modifying agents comprising these phosphorous-containing moieties can be alkyl or aryl.

Examples of phosphono and phosphino compounds are illustrated in FIG. 6, wherein it is understood by one skilled in the art that the acid form can be readily converted to a corresponding salt form.

An exemplary synthesis of a phosphonomethylated phenol is:

where Z is OH, H, phenolic, carboxylic acid, carboxylic ester or carboxylic amide with the proviso that there must be a least one active hydrogen on either the aromatic ring and/or Z must be phenolic reactive in a condensation reaction. If 3 phosphonomethyl (CH2PO3-Na+) groups are present, then Z must be phenolic.

In this method, a ortho, ortho' or para methylolated phenol (i.e. any resole) can react with P(OR)$_3$ to form the phosphonoester and hydrolyzed to the phosphonic acid or the monophosphonic ester.

In addition, the modifying agent can contain a mono- or disubstituted phosphonomethyl amino group as illustrated in FIG. 10. In this embodiment, a phenolic amine compound can be phosphonomethylated using formaldehyde in conjunction with H$_3$PO$_3$ (or formaldehyde with H$_2$PO$_2$ to carry out phosphinomethylation) to make the dispersing, ionic functionality. Phosphonomethylated amino-phenols

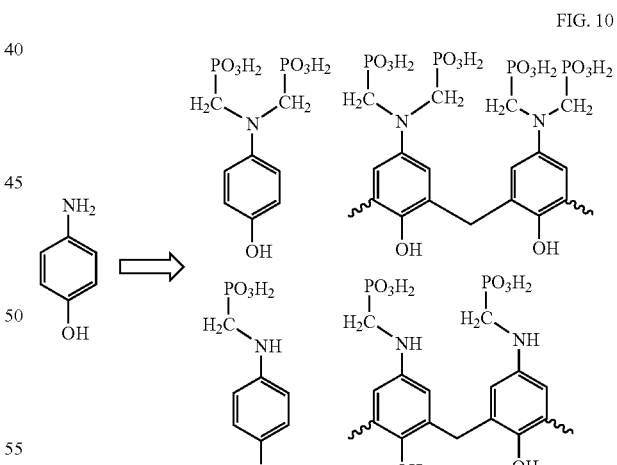

FIG. 10

It is understood by one skilled in the art that the illustrated acid forms in FIG. 10 can be converted to salt forms.

In addition, the modifying agent can be, for example, a derivative of vinylphosphonic acid or vinylidenediphosphonic acid. These are prepared by Michael Addition as illustrated in FIG. 11. Again, it is understood by those skilled in the art that illustrated acidic forms can be converted to corresponding salt structures having monovalent ions.

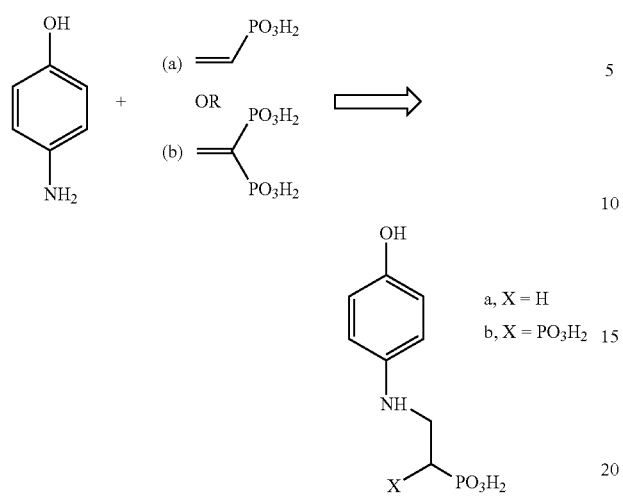

Still further, the modifying agent can be, for example, a phosphonic aldehyde compound, including an aliphatic phosphonic aldehyde compound, as illustrated in FIG. 12. Illustrated acid forms are understood by one skilled in the art to be convertible to corresponding salt forms having monovalent ions.

FIG. 12-1

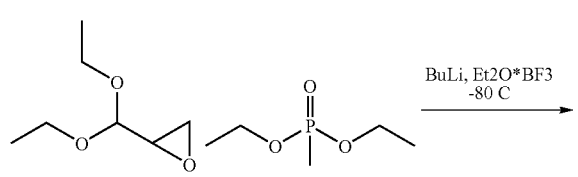

FIG. 12-3

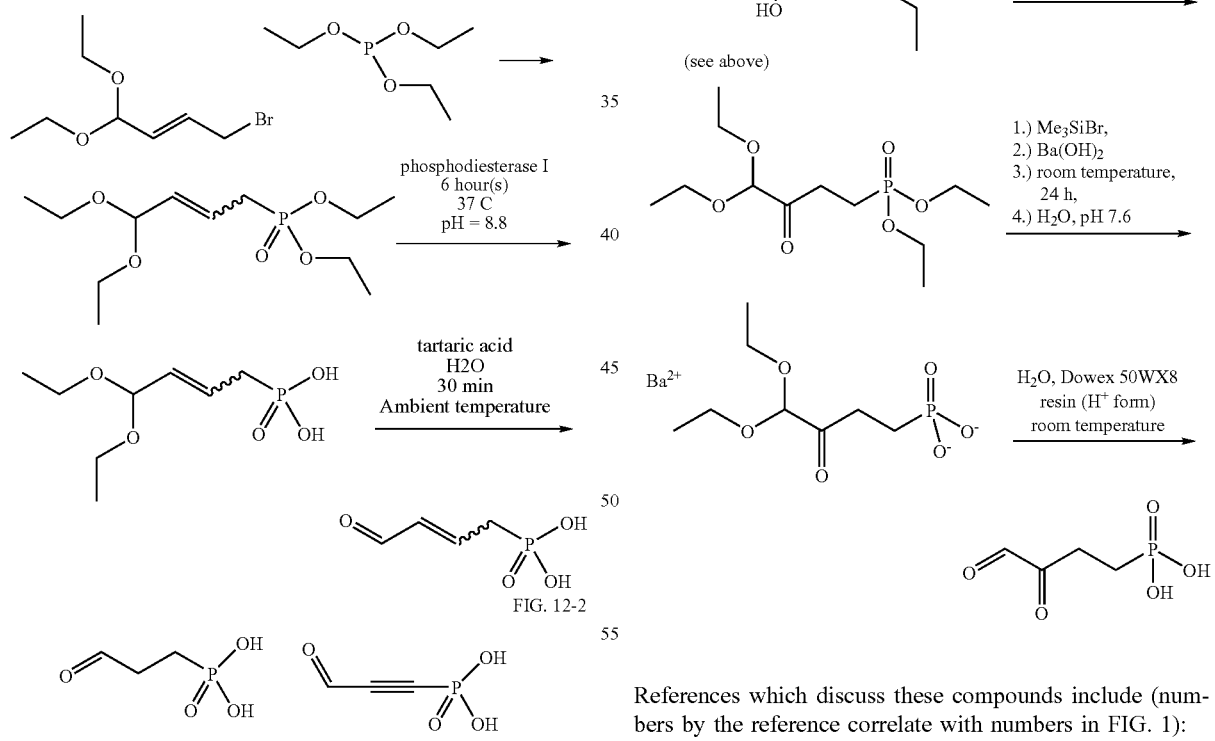

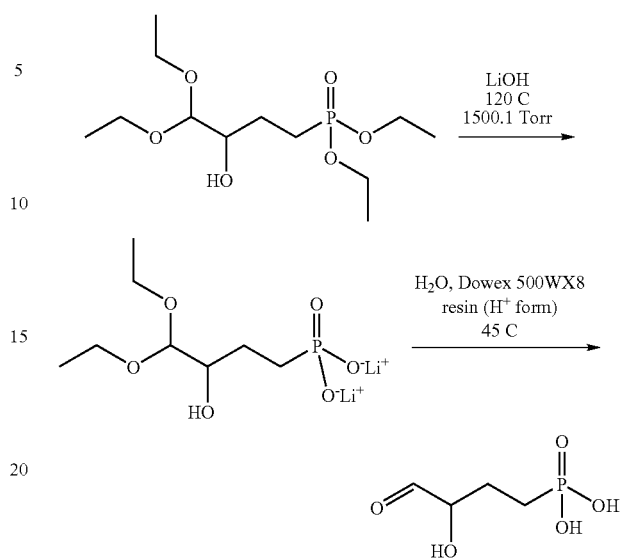

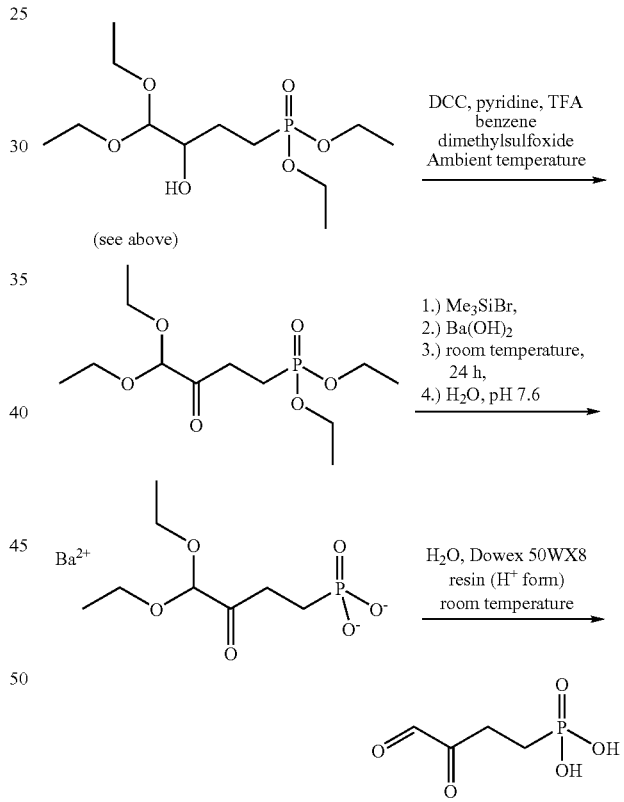

References which discuss these compounds include (numbers by the reference correlate with numbers in FIG. 1):

1) Natchev. I. A., *Tetrahedron*, 44(5), 1511–1522 (1988).
2) Rudinskas, A. J.; Hullar, T. L., *J. Med. Chem.*, 19, 1367–1371 (1976).
3) Page, P.; Blonski, C.; Perie, J., *Tetrahedron Lett.*, 36(44), 8027–8030 (1995).
4) Page, P.; Blonski, C.; Perie, J., *Bioorgan. Med. Chem.*, 7(7), 1403–1412 (1999).

In FIG. 13, embodiments based on modifying agents comprising nitrogen and phosphorous are illustrated, including phosphonic amides.

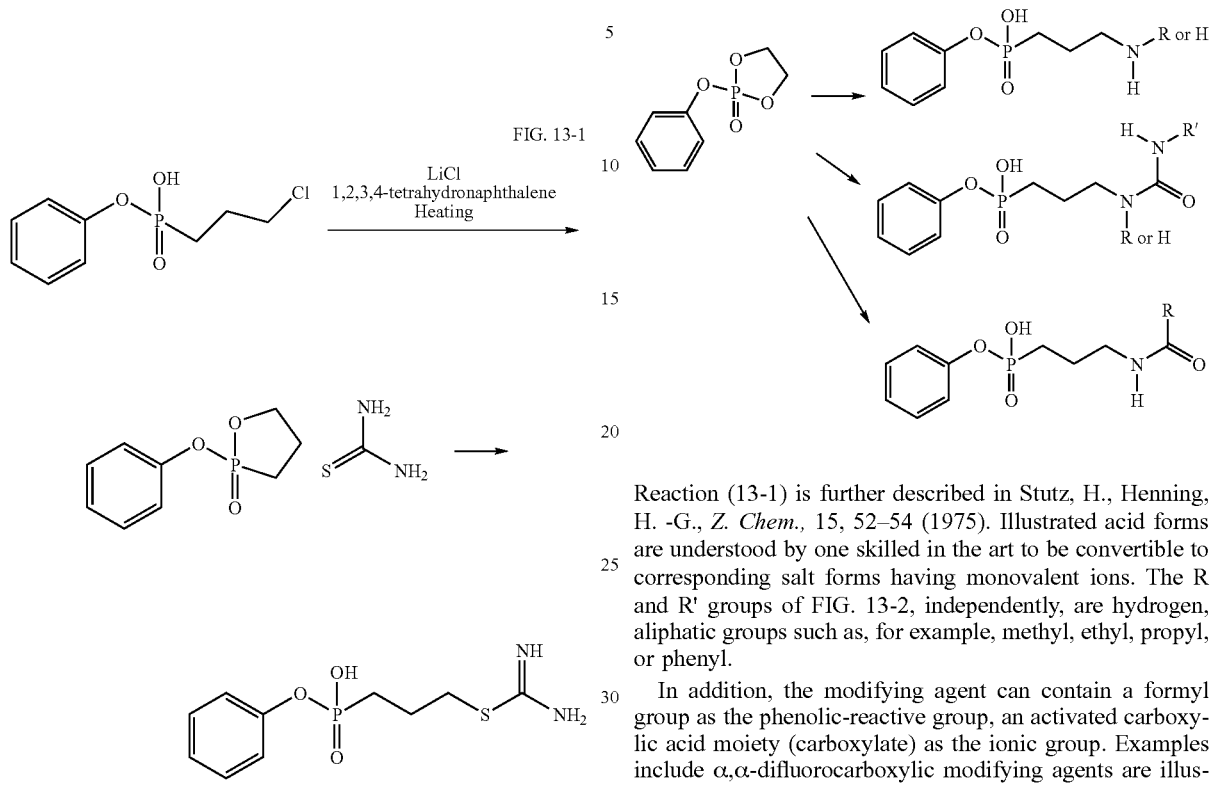

FIG. 13-1

FIG. 13-2

Reaction (13-1) is further described in Stutz, H., Henning, H. -G., *Z. Chem.*, 15, 52–54 (1975). Illustrated acid forms are understood by one skilled in the art to be convertible to corresponding salt forms having monovalent ions. The R and R' groups of FIG. 13-2, independently, are hydrogen, aliphatic groups such as, for example, methyl, ethyl, propyl, or phenyl.

In addition, the modifying agent can contain a formyl group as the phenolic-reactive group, an activated carboxylic acid moiety (carboxylate) as the ionic group. Examples include α,α-difluorocarboxylic modifying agents are illustrated in FIG. 14-1.

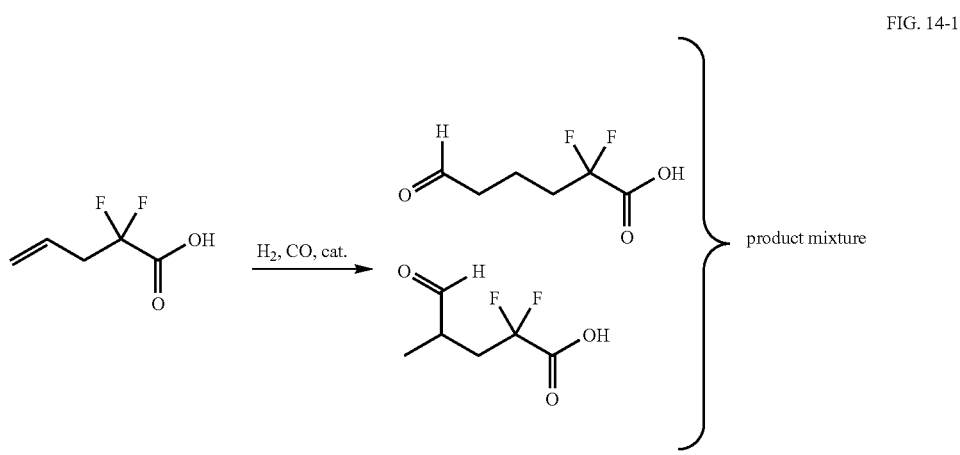

FIG. 14-1

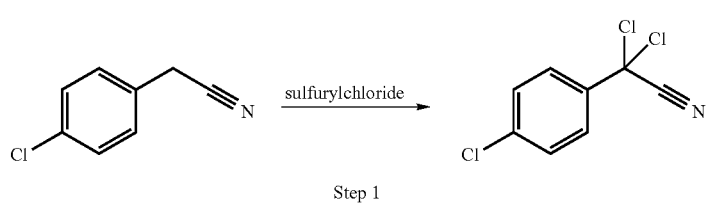

FIG. 14-2

Step 1

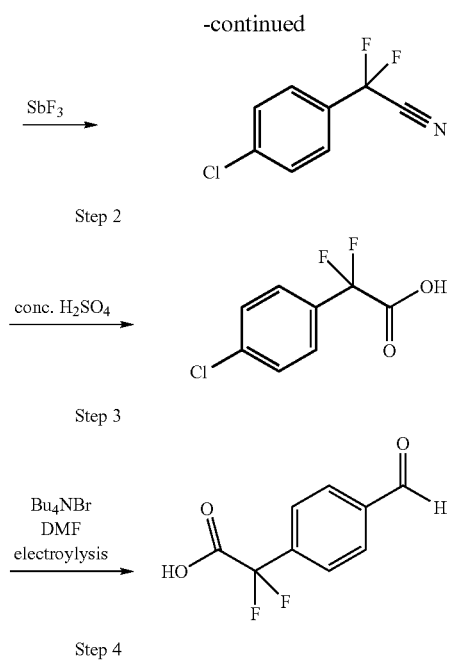

-continued

Step 2

Step 3

Step 4

Steps 1 and 3 are disclosed in U.S. Pat. No. DE 2,234,802. Steps 2 and 4 are proposed. The hydrolysis step 4 is adaptable from the work of J. Chaussard et al., *Synthesis* (5), 369–381 (1990).

The reaction-enabling functional moiety of the modifying agent can be any functional group that provides a site on the modifying agent for undergoing condensation with a phenolic resin. If the phenolic resin precursor is a resole, the modifying agent reacts with an alkylol or benzyl ether group of the resole. If the modifying agent is aromatic, the reaction-enabling functional moiety is a substituent on the aromatic ring that causes a site on the ring to be reactive to the alkylol or benzyl ether of the resole precursor. An example of such a substituent is a hydroxy or hydroxyalkyl, with hydroxy being preferred. The hydroxy- or hydroxyalkyl-substituted aromatic modifying agent is reactive at a site ortho and/or para to the hydroxy substituent. In other words, the aromatic modifying agent is bonded to, or incorporated into the phenolic resin precursor at the active hydrogen sites on the aromatic ring of the modifying agent that are ortho and/or para to a phenolic hydroxy. At least two reaction-enabling functional moieties are preferred to enhance the reactivity of the aromatic modifying agent with the phenolic resin precursor.

Alternatively, the reaction-enabling functional moiety of the modifying agent can be a formyl group (—CHO), preferably attached to a carbon atom of an aromatic ring. In this instance, the phenolic resin precursor is a novolak rather than a resole. The novolak precursor is reacted via an acid catalyzed aldehyde condensation reaction with the formyl group-containing modifying agent so that the formyl group forms a divalent methylene linkage to an active site on an aromatic ring of the backbone structure of the novolak precursor. Consequently, the modifying agent structure (including the ionic moiety) is incorporated into the phenolic structure through the generated methylene linkage. Examples of such formyl group-containing modifying agents include 2-formylbenzene sulfonate, 5-formylfuran sulfonate and $(R)(SO_3)CH—CH_2—C(O)(H)$ compounds wherein R is $C_1$–$C_4$ alkyl groups.

Another alternative reaction-enabling functional moiety could be a diazo group (—$N_2^+$), preferably attached to a carbon atom of an aromatic ring. In this instance, the phenolic resin precursor is a novolak rather than a resole. The novolak precursor is reacted via a diazo coupling reaction with the diazo group-containing modifying agent so that the diazo group forms a divalent diazo linkage (—N═) to an active site on an aromatic ring of the backbone structure of the novolak precursor. Consequently, the modifying agent structure (including the ionic moiety) is incorporated into the phenolic structure through the diazo linkage. An example of such diazo modifying agents is 1-diazo-2-naphthol-4-sulfonic acid.

The modifying agent also can optionally include a functional moiety that is capable of chelating with a metal ion that is present on a substrate surface on which the phenolic resin dispersion is applied. The chelating group remains as a residual group after the condensation of the phenolic resin precursor and the aromatic modifying agent. Typically, the chelating group is a substituent on the aromatic ring that is capable of forming a 5- or 6-membered chelation structure with a metal ion. Examples of such substituents include hydroxy and hydroxyalkyl, with hydroxy being preferred. At least two such functional groups must be present on the modifying agent molecule to provide the chelating. In the case of an aromatic modifying agent, the chelating groups should be located in an ortho position relative to each other. A significant advantage of the invention is that hydroxy or hydroxyalkyl substituents on the aromatic modifying agent can serve two roles—condensation enablement and subsequent metal chelating.

An aromatic modifying agent is particularly advantageous. Preferably, the ionic group and the reaction-enabling moiety are attached to different aromatic rings in the case of multi-aromatic ring modifying agents. The ionic group, particularly sulfonate, appears to have a strong deactivating effect on condensation reactions of the ring to which it is attached. However, it should be recognized that this consideration for the location of the ionic and reaction-enabling moieties is not applicable to the formyl group-containing modifying agent and diazo modifying agent.

A preferred structure for the aromatic modifying agent is represented by formulae Ia or Ib below:

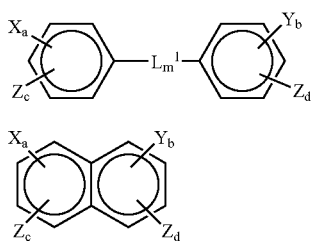

Formula Ia

Formula Ib wherein X is the ionic group; Y is the reaction-enabling substituent; Z is the chelating substituent; $L^1$ is a divalent linking group such as an alkylene radical (for example, methylene) or a diazo (—N=N—); a is 1; b is 1 to 4; m is 0 or 1; and c and d are each independently 0 to 3, provided there are not more than 4 substituents on each aromatic ring. If a chelating group Z is present it is positioned ortho to another chelating group Z or to Y. It should be recognized that the reaction-enabling substituent Y may also act as a chelating substituent. In this instance, the aromatic modifying agent may not include an independent chelating substituent Z. An aromatic modifying agent according to formulae Ia or Ib could also include other substituents provided they do not adversely interfere with the ionic group or the condensation reaction.

Illustrative aromatic modifying agents include salts of 6,7-dihydroxy-2-napthalenesulfonate; 6,7-dihydroxy-1-naphthalenesulfonate; 6,7-dihydroxy-4-naphthalenesulfonate; Acid Red 88; Acid Alizarin Violet N; Erichrome Black T; Erichrome Blue Black B; Brilliant Yellow; Crocein Orange G; Biebrich Yellow; and Palatine Chrome Black 6BN. 6,7-dihydroxy-2-naphthalenesulfonate, sodium salt is the preferred aromatic modifying agent.

It should be recognized that the preferred sulfonate modification contemplated herein involves an indirect sulfonation mechanism. In other words, the aromatic modifying agent includes a sulfonate group and is reacted with another aromatic compound (the phenolic resin precursor) to obtain the chain extended, sulfonate-modified phenolic resin product. This indirect sulfonation is distinctly different than direct sulfonation of the phenolic resin precursor.

Any phenolic resin could be employed as the phenolic resin precursor, but it has been found that resoles are especially suitable. The resole precursor should have a sufficient amount of active alkylol or benzyl ether groups that can initially condense with the modifying agent and then undergo further subsequent condensation. Of course, the phenolic resin precursor has a lower molecular weight than the final dispersed resin since the precursor undergoes condensation to make the final dispersed resin. Resoles are prepared by reacting a phenolic compound with an excess of an aldehyde in the presence of a base catalyst. Resole resins are usually supplied and used as reaction product mixtures of monomeric phenolic compounds and higher molecular weight condensation products having alkylol (—ArCH$_2$—OH) or benzyl ether termination (—ArCH$_2$—O—CH$_2$Ar), wherein Ar is an aryl group. These resole mixtures or prepolymers (also known as stage A resin) can be transformed into three-dimensional, crosslinked, insoluble and infusible polymers by the application of heat.

The reactants, conditions and catalysts for preparing resoles suitable for the resole precursor of the present invention are well-known. The phenolic compound can be any of those previously listed or other similar compounds, although multi-hydroxy phenolic compounds are undesirable. Particularly preferred phenolic compounds for making the resole precursor include phenol per se and alkylated phenol. The aldehyde also can be any of those previously listed or other similar compounds, with formaldehyde being preferred. Low molecular weight, water soluble or partially water soluble resoles are preferred as the precursor because such resoles maximize the ability to condense with the modifying agent. The F/P ratio of the resole precursor should be at least 0.90. Illustrative commercially available resoles that are suitable for use as a precursor include a partially water soluble resole available from Georgia Pacific under the trade designation BRL 2741 and a partially water soluble resoles available from Schenectady International under the trade designations HRJ11722 and SG3100.

Preferably, the dispersed novolak is produced by reacting or mixing 1 mol of modifying agent(s) with 2–20 mol of phenolic resin (preferably resole) precursor(s) and, preferably, 2–20 mol of multi-hydroxy phenolic compound(s). An aldehyde compound, preferably formaldehyde, is also required to make the novolak. The aldehyde compound can optionally be added as a separate ingredient in the initial reaction mixture or the aldehyde compound can be generated in situ from the resole precursor. The resole precursor(s), multi-hydroxy phenolic compound(s) and modifying agent(s) co-condense to form the dispersed novolak. The reaction typically is acid catalyzed with an acid such as phosphoric acid. The F/P ratio of aldehyde compound(s) to combined amount of resole precursor(s) and multi-hydroxy phenolic compound(s) in the initial reaction mixture preferably is less than 0.9. Preferably, synthesis of the dispersed novolak is a two stage reaction. In the first stage, the resole precursor(s) is reacted with the modifying agent(s) and, optionally, a small amount of multi-hydroxy phenolic compound(s). Once this first stage reaction has reached the desired point (i.e. the resin can be readily formed into a translucent dispersion), the acid catalyst and a greater amount of multi-hydroxy phenolic compound(s) is added to the reaction mixture. Pyrocatechol (also simply known as catechol) is a preferred multi-hydroxy phenolic compound for reacting in the first stage and resorcinol is a preferred multi-hydroxy phenolic compound for reacting in the second stage.

Hydrophilic novolaks typically have a hydroxy equivalents of between 1 and 3 per aromatic ring. Preferably, dispersed hydrophilic novolaks according to the invention have a hydroxy equivalents of 1.1 to 2.5, more preferably 1.1 to 2.0. The hydroxy equivalents is calculated based on the amount of multi-hydroxy phenolic compounds used to make the novolak.

According to a preferred embodiment, the dispersed phenolic resin reaction product contains a mixture of oligomers having structures believed to be represented by the following formulae IIa or IIb:

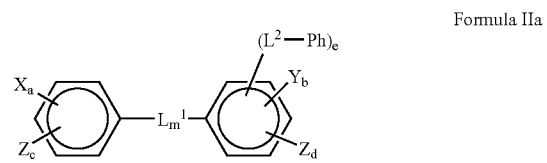

Formula IIa

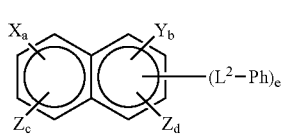

Formula IIb wherein X, Y, Z and $L^1$ and subscripts a, b, c, d and m are the same as in formulae Ia and Ib, e is 1 to 6, $L^2$ is a divalent linking group and Ph is the phenolic resin backbone structure, provided the -($L^2$-Ph) group(s) is(are) ortho or para to a Y group. $L^2$ depends upon the particular phenolic resin, but typically is a divalent alkylene radical such as methylene (—$CH_2$—) or oxydimethylene (—$CH_2$—O—$CH_2$—). Preferably, e is 2 and the -($L^2$-Ph) groups are in para position to each other.

According to a preferred embodiment wherein the phenolic resin is a novolak and the modifying agent is a naphthalene having a ionic pendant group X and two reaction-enabling substituents Y, the dispersed phenolic resin reaction product contains a mixture of oligomers having structures believed to be represented by the following formula IV:

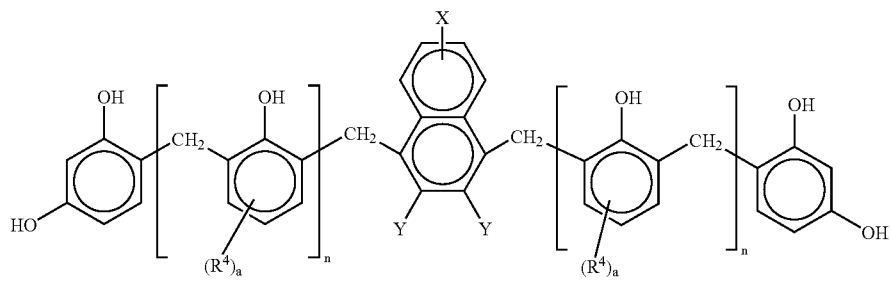

wherein X and Y are the same as in formulae Ia and Ib, a is 0 or 1, n is 0 to 5 and $R^4$ is independently hydroxyl, alkyl, aryl, alkylaryl or aryl ether. Preferably, $R^4$ is tert-butyl. If 6,7-dihydroxy-2-naphthalenesulfonate, sodium salt is the modifying agent, X will be $SO_3^-Na^+$ and each Y will be OH. In this case the hydroxy groups for Y will also act as chelating groups with a metal ion.

It should be recognized that the dispersed phenolic resin reaction product may also contain oligomers or compounds having structures that vary from the idealized structures shown in formula IV.

If the modifying agent is a sulfur-containing ionic group, the resulting modified phenolic resin preferably has a carbon/sulfur atom ratio of 20:1 to 200:1, preferably 20:1 to 100:1. If the sulfur content is greater than the 20:1 carbon/sulfur atom ratio, the modified phenolic resin begins to become water soluble, is more stable with respect to multivalent ions and is difficult to thermoset. These characteristics are adverse to the preferred use of the phenolic resin dispersion of the invention. If the sulfur content is below the 200:1 carbon/sulfur atom ratio, then the resin dispersion cannot maintain its stability. Viewed another way, the dispersed phenolic resins have 0.01 to 0.10, preferably 0.03 to 0.06, equivalents of sulfonate functionality/100 g resin. The aqueous dispersion of the phenolic resin preferably has a solids content of 1 to 50, preferably 15 to 30.

The modifying agent and the phenolic resin precursor can be reacted under conditions effective to promote condensation of the modifying agent with the phenolic resin precursor. The reaction is carried out in water under standard phenolic resin condensation techniques and conditions. The reactant mixture (including water) generally is heated from 50 to 100° C. under ambient pressure, although the specific temperature may differ considerably depending upon the specific reactants and the desired reaction product. The resulting product is a concentrate that is self-dispersible upon the addition of water and agitation to reach a desired solids content. The final dispersion can be filtered to remove any gelled agglomerations.

The intermediate modified resoles or novolaks that are initially produced in the synthesis are not necessarily water dispersible, but as the chain extension is advanced the resulting chain extended modified resoles or novolaks become progressively more water dispersible by simple mechanical agitation. The chain extension for the dispersed resole is determined by measuring the viscosity of the reaction mixture. Once the resole reaction mixture has a reached the desired viscosity, which varies depending upon the reactant composition, the reaction is stopped by removing the heat. The chain extension for the dispersed novolak is determined by pre-selecting the F/P ratio of the total reaction mixture (in other words, the amount of aldehyde compound(s) relative to the amount of phenolic(s) in both the first and second stages). The reaction for the novolak is allowed to proceed until substantially all the total amount of the reactants have reacted. In other words, there is essentially no unreacted reactant remaining. Preferably, the molecular weight (i.e., chain extension) of the novolak should be advanced to just below the gel point.

The novolak dispersion can be present in the metal treatment composition in any amount. Preferably, it is present in an amount of 1 to 20, more preferably, 2 to 6, based on the total weight of the non-volatile components of the composition.

The phenolic resin dispersion forms environmentally (especially corrosion) resistant, non-resolvatable films when applied to a metal surface and cured. As used herein, "non-resolvatable" means that the film does not resolvate when an aqueous covercoat is applied to the film before it is thermoset. If the film resolvated, the components of the film would dissolve or disperse into the aqueous covercoat thus destroying any advantage intended from the formation of the film on a surface. The low ionic content of the modified phenolic resin dispersion (relative to water soluble phenolic resins) allows them to behave similarly to non-ionically modified resins and form very water resistant films on curing.

The acid can be any acid that is capable of reacting with a metal to generate multivalent ions. Illustrative acids include hydrofluoric acid, phosphoric acid, sulfuric acid, hydrochloric acid and nitric acid. In the case of steel the multivalent ions will be ferric and/or ferrous ions. Aqueous solutions of phosphoric acid are preferred. When the acid is mixed into the composition presumably the respective ions are formed and exist as independent species in addition to the presence of the free acid. In other words, in the case of phosphoric acid, phosphate ions and free phosphoric acid co-exist in the formulated final multi-component composition. The acid preferably is present in an amount of 5 to 300 parts by weight, more preferably 10 to 160 parts by weight, based on 100 parts by weight of the phenolic novolak resin dispersion (A).

Water, preferably deionized water, is utilized in the metal treatment composition of the invention in order to vary the solids content. Although the solids content may be varied as desired, the solids content of the metal treatment composition typically is 1 to 10, preferably 3 to 6%. Since the metal treatment composition is waterborne it is substantially free of volatile organic compounds.

The resulting coating from application of the metal treatment composition is a thin, tightly bound interpenetrating organic/inorganic matrix of phenolic/metal phosphates at the metal substrate interface. This matrix can be further flexibilized with polymers. The flexibilizer (C) is any material that contributes flexibility and/or toughness to the film formed from the composition. The toughness provided by the flexibilizer provides fracture resistance to the film. The flexibilizer should be non-glassy at ambient temperature and be an aqueous emulsion latex or aqueous dispersion that is compatible with the phenolic novolak resin dispersion (A). The flexibilizer preferably is formulated into the composition in the form of an aqueous emulsion latex or aqueous dispersion Suitable flexibilizers include aqueous latices, emulsions or dispersions of (poly)butadiene, neoprene, styrene-butadiene rubber, acrylonitrile-butadiene rubber (also known as nitrile rubber), halogenated polyolefin, acrylic polymer, urethane polymer, ethylene-propylene copolymer rubber, ethylene-propylene-diene terpolymer rubber, styrene-acrylic copolymer, polyamide, poly(vinyl acetate) and the like. Halogenated polyolefins, nitrile rubbers and styrene-acrylic copolymers are preferred.

A suitable styrene-acrylic polymer latex is commercially available from Goodyear Tire & Rubber under the trade designation PLIOTEC and described, for example, in U.S. Pat. Nos. 4,968,741; 5,122,566 and 5,616,635. According to U.S. Pat. No. 5,616,635, such a copolymer latex is made from 45–85 weight percent vinyl aromatic monomers, 15–50 weight percent of at least one alkyl acrylate monomer and 1–6 weight percent unsaturated carbonyl compound. Styrene is the preferred vinyl aromatic monomer, butyl acrylate is the preferred acrylate monomer and acrylic acid and methacrylic acid are the preferred unsaturated carbonyl compound. The mixture for making the latex also includes at least one phosphate ester surfactant, at least one water-insoluble nonionic surface active agent and at least one free radical initiator.

If nitrile rubber is the flexibilizer, it is preferably mixed into the composition as an emulsion latex. It is known in the art that nitrile rubber emulsion latices are generally made from at least one monomer of acrylonitrile or an alkyl derivative thereof and at least one monomer of a conjugated diene, preferably butadiene. According to U.S. Pat. No. 4,920,176 the acrylonitrile or alkyl derivative monomer should be present in an amount of 0 to 50 percent by weight based on the total weight of the monomers. The conjugated diene monomer should be present in an amount of 50 percent to 100 percent by weight based on the total weight of the monomers. The nitrile rubbers can also optionally include various co-monomers such as acrylic acid or various esters thereof, dicarboxylic acids or combinations thereof. The polymerization of the monomers typically is initiated via free radical catalysts. Anionic surfactants typically are also added. A suitable nitrile rubber latex is available from B. F. Goodrich under the trade designation HYCAR.

Representative halogenated polyolefins include chlorinated natural rubber, chlorine- and bromine-containing synthetic rubbers including polychloroprene, chlorinated polychloroprene, chlorinated polybutadiene, hexachloropentadiene, butadiene/halogenated cyclic conjugated diene adducts, chlorinated butadiene styrene copolymers, chlorinated ethylene propylene copolymers and ethylene/propylene/non-conjugated diene terpolymers, chlorinated polyethylene, chlorosulfonated polyethylene, poly(2,3-dichloro-1,3-butadiene), brominated poly(2,3-dichloro-1,3-butadiene), copolymers of $\alpha$-haloacrylonitriles and 2,3-dichloro-1,3-butadiene, chlorinated poly(vinyl chloride) and the like including mixtures of such halogen-containing elastomers.

Latices of the halogenated polyolefin can be prepared according to methods known in the art such as by dissolving the halogenated polyolefin in a solvent and adding a surfactant to the resulting solution. Water can then be added to the solution under high shear to emulsify the polymer. The solvent is then stripped to obtain a latex. The latex can also be prepared by emulsion polymerization of the halogenated ethylenically unsaturated monomers.

Butadiene latices are particularly preferred as the flexibilizer (C). Methods for making butadiene latices are well-known and are described, for example, in U.S. Pat. Nos. 4,054,547 and 3,920,600, both incorporated herein by reference. In addition, U.S. Pat. Nos. 5,200,459; 5,300,555; and 5,496,884 disclose emulsion polymerization of butadiene monomers in the presence of polyvinyl alcohol and a co-solvent such as an organic alcohol or a glycol.

The butadiene monomers useful for preparing the butadiene polymer latex can essentially be any monomer containing conjugated unsaturation. Typical monomers include 2,3-dichloro-1,3-butadiene; 1,3-butadiene; 2,3-dibromo-1,3-butadiene isoprene; isoprene; 2,3-dimethylbutadiene; chloroprene; bromoprene; 2,3-dibromo-1,3-butadiene; 1,1,2-trichlorobutadiene; cyanoprene; hexachlorobutadiene; and combinations thereof. It is particularly preferred to use 2,3-dichloro-1,3-butadiene since a polymer that contains as its major portion 2,3-dichloro-1,3-butadiene monomer units has been found to be particularly useful in adhesive applications due to the excellent bonding ability and barrier properties of the 2,3-dichloro-1,3-butadiene-based polymers. As described above, an especially preferred embodiment of the present invention is one wherein the butadiene polymer includes at least 60 weight percent, preferably at least 70 weight percent, 2,3-dichloro-1,3-butadiene monomer units.

The butadiene monomer can be copolymerized with other monomers. Such copolymerizable monomers include $\alpha$-haloacrylonitriles such as $\alpha$-bromoacrylonitrile and $\alpha$-chloroacrylonitrile; $\alpha,\beta$-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; $\alpha$-bromovinylketone; vinylidene chloride; vinyl toluenes; vinyl-naphthalenes; vinyl ethers, esters and ketones such as methyl vinyl ether, vinyl acetate and methyl vinyl ketone; esters amides, and nitriles of acrylic and methacrylic acids such as ethyl acrylate, methyl methacrylate, glycidyl acrylate, methacrylamide and acrylonitrile; and combinations of such monomers. The copolymerizable monomers, if utilized, are preferably α-haloacrylonitrile and/or α,β-unsaturated carboxylic acids. The copolymerizable monomers may be utilized in an amount of 0.1 to 30 weight percent, based on the weight of the total monomers utilized to form the butadiene polymer.

In carrying out the emulsion polymerization to produce the latex other optional ingredients may be employed during the polymerization process. For example, conventional anionic and/or nonionic surfactants may be utilized in order to aid in the formation of the latex. Typical anionic surfactants include carboxylates such as fatty acid soaps from lauric, stearic, and oleic acid; acyl derivatives of sarcosine such as methyl glycine; sulfates such as sodium lauryl sulfate; sulfated natural oils and esters such as Turkey Red Oil; alkyl aryl polyether sulfates; alkali alkyl sulfates; ethoxylated aryl sulfonic acid salts; alkyl aryl polyether sulfonates; isopropyl naphthalene sulfonates; sulfosuccinates; phosphate esters such as short chain fatty alcohol partial esters of complex phosphates; and orthophosphate esters of polyethoxylated fatty alcohols. Typical nonionic surfactants include ethoxylated (ethylene oxide) derivatives such as ethoxylated alkyl aryl derivatives; mono- and polyhydric alcohols; ethylene oxide/propylene oxide block copolymers; esters such as glyceryl monostearate; products of the dehydration of sorbitol such as sorbitan monostearate and polyethylene oxide sorbitan monolaurate; amines; lauric acid; and isopropenyl halide. A conventional surfactant, if utilized, is employed in an amount of 0.01 to 5 parts, preferably 0.1 to 2 parts, per 100 parts by weight of total monomers utilized to form the butadiene polymer.

In the case of dichlorobutadiene homopolymers, anionic surfactants are particularly useful. Such anionic surfactants include alkyl sulfonates and alkyl aryl sulfonates (commercially available from Stepan under the trade designation POLYSTEP) and sulfonic acids or salts of alkylated diphenyl oxide (for example, didodecyl diphenyleneoxide disulfonate or dihexyl diphenyloxide disulfonate commercially available from Dow Chemical Co. under the trade designation DOWFAX).

Chain transfer agents may also be employed during emulsion polymerization in order to control the molecular weight of the butadiene polymer and to modify the physical properties of the resultant polymer as is known in the art. Any of the conventional organic sulfur-containing chain transfer agents may be utilized such as alkyl mercaptans and dialkyl xanthogen disulfides.

The emulsion polymerization is typically triggered by a free radical initiator. Illustrative free radical initiators include conventional redox systems, peroxide systems, azo derivatives and hydroperoxide systems. The use of a redox system is preferred and examples of such systems include ammonium persulfate/sodium metabisulfite, ferric sulfate/ascorbic acid/hydroperoxide and tributylborane/hydroperoxide, with ammonium persulfate/sodium metabisulfite being most preferred.

The emulsion polymerization is typically carried out at a temperature of 10°–90° C., preferably 40°–60° C. Monomer conversion usually ranges from 70–100, preferably 80–100, percent. The latices preferably have a solids content of 10 to 70, more preferably 30 to 60, percent; a viscosity between 50 and 10,000 centipoise at 25° C.; and a particle size between 60 and 300 nanometers.

Especially preferred as the butadiene latex is a butadiene polymer that has been emulsion polymerized in the presence of a styrene sulfonic acid, styrene sulfonate, poly(styrene sulfonic acid), or poly(styrene sulfonate) stabilizer to form the latex. Poly(styrene sulfonate) is the preferred stabilizer. This stabilization system is particularly effective for a butadiene polymer that is derived from at least 60 weight percent dichlorobutadiene monomer, based on the amount of total monomers used to form the butadiene polymer. The butadiene polymer latex can be made by known emulsion polymerization techniques that involve polymerizing the butadiene monomer (and copolymerizable monomer, if present) in the presence of water and the styrene sulfonic acid, styrene sulfonate, poly(styrene sulfonic acid), or poly (styrene sulfonate) stabilizer. The sulfonates can be salts of any cationic groups such as sodium, potassium or quaternary ammonium. Sodium styrene sulfonate is a preferred styrene sulfonate compound. Poly(styrene sulfonate) polymers include poly(styrene sulfonate) homopolymer and poly(styrene sulfonate) copolymers such as those with maleic anhydride. Sodium salts of poly(styrene sulfonate) are particularly preferred and are commercially available from National Starch under the trade designation VERSA TL. The poly(styrene sulfonate) can have a weight average molecular weight from $5 \times 10^4$ to $1.5 \times 10^6$, with $1.5 \times 10^5$ to $2.5 \times 10^5$ being preferred. In the case of a poly(styrene sulfonate) or poly(styrene sulfonic acid) it is important to recognize that the emulsion polymerization takes place in the presence of the pre-formed polymer. In other words, the butadiene monomer is contacted with the pre-formed poly(styrene sulfonate) or poly(styrene sulfonic acid). The stabilizer preferably is present in an amount of 0.1 to 10 parts, preferably 1 to 5 parts, per 100 parts by weight of total monomers utilized to form the butadiene polymer.

The flexibilizer (C), if present, preferably is included in the composition in an amount of 5 parts by weight to 300 parts by weight, based on 100 parts by weight phenolic novolak resin dispersion (A). More preferably, the flexibilizer is present in an amount of 25 parts by weight to 100 parts by weight, based on 100 parts by weight of the phenolic novolak resin dispersion (A).

The modified phenolic resin dispersion can be cured to form a highly crosslinked thermoset via known curing methods for phenolic resins. The curing mechanism can vary depending upon the use and form of the phenolic resin dispersion. For example, curing of the dispersed resole embodiment typically can be accomplished by subjecting the phenolic resin dispersion to heat. Curing of the dispersed novolak embodiment typically can be accomplished by addition of an aldehyde donor compound.

With a dispersed phenolic novolak embodiment, a curative should be introduced in order to cure the film formed by the metal treatment composition. It should be noted that the metal treatment composition cannot itself include a phenolic resin curative these curatives are not storage stable under acidic conditions. Curing of novolak can also be accomplished by the application of a curative-containing topcoat over the metal treatment film. Typically, the metal treatment composition is applied to a metal surface (either conventionally or via autodeposition) and then dried. The curative-containing topcoat then is applied to the thus treated metal surface. The curative contained in the topcoat can be an aldehyde donor compound or an aromatic nitroso compound. Topcoat compositions that include either one or both of these curatives are well-known and commercially available. If the metal treatment is a para-sulfonomethylated phenol, a topcoat is not required.

The aldehyde donor can be essentially be any type of aldehyde known to react with hydroxy aromatic compounds to form cured or crosslinked novolak phenolic resins. Typical compounds useful as an aldehyde (e.g., formaldehyde) source in the present invention include formaldehyde and aqueous solutions of formaldehyde, such as formalin; acetaldehyde; propionaldehyde; isobutyraldehyde; 2-ethylhexaldehyde; 2-methylpentaldehyde; 2-ethylhexaldehyde; benzaldehyde; as well as compounds which decompose to formaldehyde, such as paraformaldehyde, trioxane, furfural, benzoxazines and Mannich bases hexamethylenetetramine, anhydromaldehydeaniline, ethylene diamine formaldehyde; acetals which liberate formaldehyde on heating; methylol derivatives of urea and formaldehyde; methylol phenolic compounds; and the like.

It has been found that when the metal treatment composition is used in combination with the primer described in U.S. Provisional Patent Application No. 60/072,779 (incorporated herein by reference), formaldehyde species generated from the resole present in the primer appear to co-cure the novolak in the metal treatment coating via diffusion. In addition, curing or crosslinking of the novolak may occur through ionic crosslinking and chelation with the metal ions generated by the acid-metal substrate reaction.

Additionally, high molecular weight aldehyde homopolymers and copolymers can be employed as a latent formaldehyde source in the practice of the present invention. A latent formaldehyde source herein refers to a formaldehyde source which will release formaldehyde only in the presence of heat such as the heat applied during the curing of an adhesive system. Typical high molecular weight aldehyde homopolymers and copolymers include (1) acetal homopolymers, (2) acetal copolymers, (3) gamma-polyoxymethylene ethers having the characteristic structure:

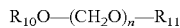

and (4) polyoxymethylene glycols having the characteristic structure:

wherein $R_{10}$ and $R_{11}$ can be the same or different and each is an alkyl group having from about 1 to 8, preferably 1 to 4, carbon atoms, $R_{12}$ and $R_{13}$ can be the same or different and each is an alkylene group having from 2 to 12, preferably 2 to 8, carbon atoms; n is greater than 100, and is preferably in the range from about 200 to about 2000; and x is in the range from about 0 to 8, preferably 1 to 4, with at least one x being equal to at least 1. The high molecular weight aldehyde homopolymers and copolymers are further characterized by a melting point of at least 75° C., i.e. they are substantially inert with respect to the phenolic system until heat activated; and by being substantially completely insoluble in water at a temperature below the melting point. The acetal homopolymers and acetal copolymers are well-known articles of commerce. The polyoxymethylene materials are also well known and can be readily synthesized by the reaction of monoalcohols having from 1 to 8 carbon atoms or dihydroxy glycols and ether glycols with polyoxymethylene glycols in the presence of an acidic catalyst. A representative method of preparing these crosslinking agents is described in U.S. Pat. No. 2,512,950, which is incorporated herein by reference. Gamma-polyoxymethylene ethers are generally preferred sources of latent formaldehyde and a particularly preferred latent formaldehyde source for use in the practice of the invention is 2-polyoxymethylene dimethyl ether.

The aromatic nitroso compound can be any aromatic hydrocarbon, such as benzenes, naphthalenes, anthracenes, biphenyls, and the like, containing at least two nitroso groups attached directly to non-adjacent ring carbon atoms. Such aromatic nitroso compounds are described, for example, in U.S. Pat. Nos. 3,258,388; 4,119,587 and 5,496,884.

More particularly, such nitroso compounds are described as aromatic compounds having from 1 to 3 aromatic nuclei, including fused aromatic nuclei, having from 2 to 6 nitroso groups attached directly to non-adjacent nuclear carbon atoms. The preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen and similar groups. Thus, where reference is made herein to "aromatic nitroso compound" it will be understood to include both substituted and unsubstituted nitroso compounds.

Particularly preferred nitroso compounds are characterized by the formula:

wherein Ar is selected from the group consisting of phenylene and naphthalene; R is a monovalent organic radical selected from the group consisting of alkyl, cycloalkyl, aryl, aralkyl, alkaryl, arylamine and alkoxy radicals having from 1 to 20 carbon atoms, amino, or halogen, and is preferably an alkyl group having from 1 to 8 carbon atoms; and m is 0, 1, 2, 3, or 4, and preferably is 0.

Exemplary suitable aromatic nitroso compounds include m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred are m-dinitrosobenzene and p-dinitrosobenzene.

The aromatic nitroso compound precursor may be essentially any compound that is capable of being converted, typically by oxidation, to a nitroso compound at elevated temperatures, typically from about 140–200° C. The most common aromatic nitroso compound precursors are derivatives of quinone compounds. Examples of such quinone compound derivatives include quinone dioxime, dibenzoquinone dioxime, 1,2,4,5-tetrachlorobenzoquinone, 2-methyl-1,4-benzoquinone dioxime, 1,4-naphthoquinone dioxime, 1,2-naphthoquinone dioxime and 2,6-naphthoquinone dioxime.

The control agent mentioned above is especially useful in the metal treatment composition of the invention described above but it could also be useful in any multi-component composition that includes an autodepositable component. The autodepositable component is any material that enables (either by itself or in combination with the other components of the composition) the multi-component composition to autodeposit on a metal surface. Preferably, the autodepositable component is any water-dispersible or water soluble resin that is capable of providing autodeposition ability to the composition. Such resins include those derived from ethylenically unsaturated monomers such as polyvinylidene chloride, polyvinyl chloride, polyethylene, acrylic, acrylonitrile, polyvinyl acetate and styrene-butadiene (see U.S. Pat. Nos. 4,414,350; 4,994,521; and 5,427,863; and PCT Published Patent Application No. WO 93/15154). Urethane and polyester resins are also mentioned as being useful. Certain epoxy and epoxy-acrylate resins are also said to be useful autodeposition resins (see U.S. Pat. No. 5,500,460 and PCT Published Patent Application No. WO 97/07163). Blends of these resins may also be used.

Especially suitable autodepositable resins are aqueous phenolic resin dispersions described in co-pending, commonly assigned U.S. Pat. No. 6,130,289, which is incorporated herein by reference.

The novolak version of this dispersed resin is described above in connection with the metal treatment composition. There is also a resole version with which the control agent of the invention may be formulated into a multi-component composition.

The phenolic resin precursor and modifying agent used to make the dispersed resole are the same as those described for the dispersed novolak. However, the dispersed resole is produced by the reaction of 1 mol of modifying agent(s) with 1 to 20 mol of phenolic resin precursor(s). A dispersed resole typically can be obtained by reacting a resole precursor or a mixture of resole precursors with the modifying agent or a mixture of agents without any other reactants, additives or catalysts. However, other reactants, additives or catalysts can be used as desired. Multi-hydroxy phenolic compound(s) can optionally be included in relatively small amounts in the reactant mixture for the resole. Synthesis of the resole does not require an acid catalyst.

Hydrophilic resoles typically have a F/P ratio of at least 1.0. According to the invention, hydrophilic resoles having a F/P ratio much greater than 1.0 can be successfully dispersed. For example, it is possible to make an aqueous dispersion of hydrophilic resoles having a F/P ratio of at least 2 and approaching 3, which is the theoretical F/P ratio limit.

According to a particularly preferred embodiment wherein the dispersed phenolic resin is a resole and the modifying agent is a naphthalene having a ionic pendant group X and two reaction-enabling substituents Y, the dispersed phenolic resin reaction product contains a mixture of oligomers having structures believed to be represented by the following formula III:

$R^2$ is methylene or oxydimethylene and $R^3$ is methylol. If 6,7-dihydroxy-2-naphthalenesulfonate, sodium salt is the modifying agent, X will be $SO_3^-Na^+$ and each Y will be OH. It should be recognized that in this case the hydroxy groups for Y will also act as chelating groups with a metal ion.

The autodepositable component can be present in the composition in any amount that provides for effective autodeposition. In general, the amount can range from 1 to 50, preferably 5 to 20, and more preferably 7 to 14, weight percent, based on the total amount of non-volatile ingredients in the composition.

The control agent is any material that is able to improve the formation of an autodeposited coating on a metallic surface and, optionally, improve the formation of another autodeposited coating applied after the control agent-containing autodeposited coating. Addition of the control agent also increases the uniformity of the thickness of the autodeposited coating. The control agent-containing composition does not require an ambient staging period in order to develop fully the coating. In other words, the metallic coating conversion is complete upon drying of the coated substrate and any subsequent coating, primer or adhesive compositions can be applied immediately after coating and drying of the control agent-containing composition. The control agent also must be compatible with the other components of the composition under acidic conditions without prematurely coagulating or destabilizing the composition.

The control agent may be a nitro compound, a nitroso compound, an oxime compound, a nitrate compound, or a similar material. A mixture of control agents may be used. Organic nitro compounds are the preferred control agents.

The organic nitro compound is any material that includes a nitro group ($-NO_2$) bonded to an organic moiety. Preferably, the organic nitro compound is water soluble or, if water insoluble, capable of being dispersed in water. Illustrative organic nitro compounds include nitroguanidine; aromatic nitrosulfonates such as nitro or dinitrobenzenesulfonate and the salts thereof such as sodium, potassium, amine or any monovalent metal ion (particularly the sodium salt of 3,5-dinitrobenzenesulfonate); Naphthol Yellow S; and picric acid (also known as trinitrophenol). Especially preferred for commercial availability and regulatory reasons is a mixture of nitroguanidine and sodium nitrobenzenesulfonate.

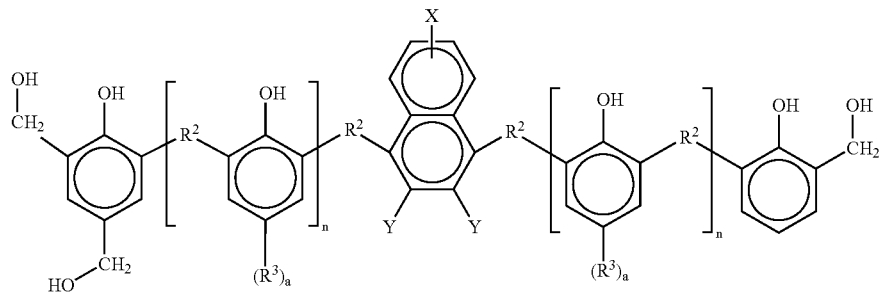

wherein X and Y are the same as in formulae Ia and Ib, a is 0 or 1; n is 0 to 5; $R^2$ is independently $-C(R^5)_2-$ or $-C(R^5)_2-O-C(R^5)_2-$, wherein $R^5$ is independently hydrogen, alkylol, hydroxyl, alkyl, aryl or aryl ether; and $R^3$ is independently alkylol, alkyl, aryl or aryl ether. Preferably, The amount of control agent(s) in a multi-component composition may vary, particularly depending upon the amount of any acid in the composition. Preferably, the amount is up to 20 weight %, more preferably up to 10 weight %, and most preferably 2 to 5 weight %, based on the total amount of non-volatile ingredients in the composition. According to a preferred embodiment, the weight ratio of nitroguanidine to sodium nitrobenzenesulfonate should range from 1:10 to 5:1.

The organic nitro compound typically is mixed into the composition in the form of an aqueous solution or dispersion. For example, nitroguanidine is a solid at room temperature and is dissolved in water prior to formulating into the composition.

The compositions of the invention may be prepared by any method known in the art, but are preferably prepared by combining and milling or shaking the ingredients and water in ball-mill, sand-mill, ceramic bead-mill, steel-bead mill, high speed media-mill or the like. It is preferred to add each component to the mixture in a liquid form such as an aqueous dispersion.

The composition may be applied to a substrate surface by any conventional method such as spraying, dipping, brushing, wiping, roll-coating (including reverse roll-coating) or the like, after which the composition typically is permitted to dry. Although conventional application methods can be used, the composition can be applied via autodeposition. The phenolic resin dispersion (A) of composition of the invention enables autodeposition of the composition on an electrochemically active metallic surface. Autodepositable compositions usually are applied by dipping the metallic substrate or part into a bath of the composition. The metal substrate can reside in the metal treatment composition bath for an amount of time sufficient to deposit a uniform film of desired thickness. Typically, the bath residence time is from about 5 to about 120 seconds, preferably about 10 to about 30 seconds, and occurs at room temperature. The metal treatment composition when it is applied to the metal substrate should be sufficiently acidic to cause reaction with the metal to liberate the metallic ions. Typically, the pH of the metal treatment composition should be 1 to 4, preferably 1.5 to 2.5, when it is applied to the metal substrate. The composition typically is applied to form a dry film thickness of 1 to 15, preferably 4 to 10 µm.

After simple forced air drying of a metal surface coated with the control agent-containing composition the metal surface can be immediately coated with another type of composition. The coated metal substrate typically is dried by subjecting it to heat and forced air. Depending upon the forced air flow, the drying usually occurs at approximately 150–200° F. for a time period ranging from 30 seconds to 10 minutes. The ambient staging period previously required after such heated drying is no longer necessary. However, immediate subsequent coating of the treated metal substrate is not required. Alternatively, the treated metal substrate can be stored for a period of time and then subsequently coated with a different composition.

Although not required since a phenolic is incorporated in the metal treatment formulation itself, the metal treatment can be used in combination with a subsequent coating of a phenolic primer as mentioned above. The combined metal treatment and phenolic primer provides corrosion resistance comparable to phosphatizing and a conventional phenolic primer.

Preferably, the metal treatment composition serves as a protective coating under a subsequently applied functional autodepositable coating such as an adhesive primer or covercoat, particularly an adhesive primer or covercoat that is useful for bonding an elastomeric substrate to a metal substrate. A further advantage of the metal treatment is that it can activate a metal surface for autodeposition of the subsequently applied coating, primer or adhesive topcoat that may include a dispersed phenolic resin as described above. Such a primer is described in more detail in co-pending, commonly assigned U.S. Provisional Patent Application No. 60/072,779, incorporated herein by reference. In addition to enhancing the corrosion resistance as explained above, autodeposition activity of the subsequent coating over the control agent-containing metal treatment composition is substantially increased according to the invention.

Although preferred, the adhesive primer or covercoat applied over the metal treatment does not have to be autodepositable. Conventional, non-autodepositable primers or covercoats can be used with the metal treatment composition. Especially useful are known elastomer-to-metal adhesive primers or covercoats such as those described in U.S. Pat. Nos. 3,258,388; 3,258,389; 4,119,587; 4,167,500; 4,483,962; 5,036,122; 5,093,203; 5,128,403; 5,200,455; 5,200,459; 5,268,404; 5,281,638; 5,300,555; and 5,496,884. Elastomer-to-metal adhesive primers and covercoats are commercially available from Lord Corporation.

The composition according to the invention also can be utilized by itself without any subsequent coating with an autodepositable primer or adhesive. Curing via crosslinking of the phenolic resin could occur through air oxidation or a surface activated chelating mechanism.

The invention will be described in more detail by way of the following non-limiting examples. The failure mechanism for the tested bond is expressed in terms of percent. A high percent of rubber retained (R) on the metal coupon is desirable since this indicates that the adhesive bond is stronger than the rubber itself. Rubber-cement failure (RC) indicates the percentage of failure at the interface between the rubber and the adhesive. Cement-metal failure (CM) indicates the percentage of failure at the interface between the metal substrate and the adhesive.

For the boiling water test the bonded test assemblies or coupons were prepared according to ASTM-D-429-B. The leading edge of each of the assemblies was stressed by suspending a two kg weight on the overlapping rubber tail and the assembly was then mounted in a fixture so that the rubber tail was at an approximately 90° angle to the plane formed by the bonded interface. The stressed edge interface was exposed to boiling water by immersing the coupon in boiling water for the indicated time period. After this time, the coupons were removed from the boiling water, allowed to cool and tested on either an Instron mechanical tester by pulling the rubber off the metal at a 45° angle stripping fixture with a crosshead speed of 2 inches per minute or by manually peeling the rubber from the metal substrate. The amount of rubber retained on the bonded area is recorded as a percentage as described above.

For the salt spray test the bonded test assemblies prepared according to ASTM-D-429-B were buffed on the edges with a grinding wheel. The rubber is then tied back over the metal with stainless steel wire so as to stress the bonded area. This exposes the bond line to the environment. The assemblies then are strung on stainless steel wire and placed in a salt spray chamber. The environment inside the chamber is 100° F., 100 percent relative humidity and 5 percent dissolved salt in the spray, which is dispersed throughout the chamber. The assemblies remain in this environment for the indicated time period. Upon removal, the rubber is peeled manually from the metal substrate. The amount of rubber retained on the bonded area is recorded as a percentage as described above.

EXAMPLE-1

Preparation of Dispersed Novolak Resin 40 g of 6,7-dihydroxy-2-naphthalenesulfonate (DHNS), sodium salt (available from Andrew Chemicals), 136 g of a water soluble resole (made from formaldehyde and phenol, F/P ratio of 2.3, 80% solids and commercially available from Schenectady under the trade designation HRJ11722), 50 g of tert-butyl catechol and 50 g of water were mixed together and steam heated for approximately three and one-half hours until the mixture became very viscous. 220 g of resorcinol and 220 g of water were added followed by 6 g of phosphoric acid in 20 g of water. Steam heating was continued for another 40 minutes. 70 g of formalin then was added while continuing steam heating resulting in a concentrate. The concentrate was filtered and self-dispersed upon the addition of 1730 g of water.

EXAMPLE-2

Preparation of Dispersed Resole Resin 160 g of 6,7-dihydroxy-2-naphthalenesulfonate, sodium salt (available from Andrew Chemicals), 1000 g of the HRJ11722 water soluble resole, and 50 g of water were mixed together and steam heated for approximately three hours resulting in a very thick concentrate. 3600 g of water was added to the concentrate which then self-dispersed and was filtered.

EXAMPLE-3

Preparation of Dispersed Novolak Resin 80 g of 6,7-dihydroxy-2-naphthalenesulfonate, sodium salt (available from Andrew Chemicals), 272 g of the HRJ11722 water soluble resin, 100 g of tert-butyl catechol and 50 g of water were mixed together and steam heated for approximately three and one-half hours until the mixture became very viscous. 440 g of resorcinol and 440 g of water were added followed by 12 g of phosphoric acid in 25 g of water. Steam heating was continued for another 40 minutes. 130 g of formalin then was added while continuing steam heating resulting in a concentrate. The concentrate was filtered and self-dispersed upon the addition of 3085 g of water.

EXAMPLE-4

Metal Treatment with Improved Bonding Performance

The following ingredients were mixed together in indicated wet weight grams to obtain a metal treatment:

| | |
|---|---|
| Aqueous novolak dispersion of Example 1 | 400 g |
| Phosphoric acid | 34 g |
| Water | 3100 g |

The following ingredients were mixed together in indicated wet weight grams to obtain a coating/primer:

| | |
|---|---|
| Carbon black | 7 g |
| ZnO | 60 g |
| Aqueous resole dispersion of Example 2 | 125 g |
| Polyvinyl alcohol-stabilized resole (BKUA 2370) | 200 g |
| Dichlorobutadiene homopolymer (VERSA TL/DOWFAX stabilized) | 150 g |
| Water | 300 g |

The metal treatment was spray applied to one set of warm steel coupons. The treated coupons were dried at 150° F. The dried treated coupons were heated for 10 minutes at 160° F. and the coating/primer was spray applied. The coupons then were heated at 150° F. for 15 minutes. With another set of coupons only the coating/primer was spray applied. A commercially available aqueous adhesive covercoat (CHEMLOK®8210 available from Lord Corporation) then was spray applied to the treated, primed coupons. Natural rubber was injection molded to the coupons at 1 minute prebake and 5 minutes cure at 360° F. The bonded test assemblies were subjected to the 40 hour boiling water test. The set of coupons that were metal treated and primed exhibited a mean bonding performance of 93R, 7CM under and the set of that were only primed exhibited a mean bonding performance of 47 R, 53 CM. When used in conjunction with CHEMLOK® 8210, the metal treatment clearly improved the bonding performance of the coating/primer.

EXAMPLE-5

Autodepositable Metal Treatment

The following ingredients were mixed together in indicated wet weight grams to obtain an autodepositable coating/primer:

| | |
|---|---|
| Carbon black | 21 g |
| ZnO | 180 g |
| Aqueous resole dispersion of Example 2 | 400 g |
| Polyvinyl alcohol-stabilized resole (BKUA 2370) | 600 g |
| Dichlorobutadiene homopolymer (VERSA TL/DOWFAX stabilized) | 450 g |
| Water | 1000 g |

The following ingredients were mixed together in indicated wet weight grams to obtain a metal treatment used as an activator composition:

| | |
|---|---|
| Aqueous novolak dispersion of Example 3 | 600 g |
| Phosphoric acid | 400 g |
| Water | 2700 g |

Phosphatized steel coupons were dipped in a bath of the metal treatment composition (4% solids) for 5 seconds. The metal treatment composition formed a continuous wet film on the steel coupon surface indicating successful autodeposition. The treated coupons then were dried at 150° F. The dried treated coupons were then dipped in a bath of the coating/primer (20% solids) for 15 seconds. The coating/primer composition formed a continuous wet film on the steel coupon surface indicating successful autodeposition. The coated coupons then were dried for 15 minutes at 150° F. A one inch area then was masked off and a commercially available aqueous adhesive covercoat (CHEMLOK®8282 available from Lord Corporation) was spray applied onto the treated and coated coupons. The coupons then were prebaked for 30 seconds at 360° F. prior to bonding natural rubber for 5 minutes at 360° F. to the adhesive coated coupon. This procedure was repeated, but the prebake was for 1 minute at 340° F. and bonding was for 7 and one-half minutes at 340° F. The resulting test assemblies were subjected to the 4 hour boiling water test and the salt spray test (500, 750 and 1000 hours). The results for all of the assemblies were 100% R bonding performance, no underbond corrosion and very minor blistering in the unbonded portion that had been masked off.

EXAMPLES 6–14

Metal Treatment that Includes Control Agent

A phenolic novolak resin aqueous dispersion was made by mixing together 160 g of sodium salt of 6,7-dihydroxy-2-naphthalenesulfonate, 544 g of a water soluble resole (made from formaldehyde and phenol, F/P ratio of 2.3, 80% solids and commercially available from Schenectady under the trade designation HRJ11722), 200 g of catechol and 200 g of water and steam heating for approximately two hours until the reaction mixture became very viscous and provided a clear dispersion. 880 g of resorcinol and 500 g of water were added followed by 12 g of phosphoric acid in 10 g of water. Steam heating was continued for another 15 minutes. 640 g of formalin (18.5% aqueous solution) then was added while continuing steam heating resulting in a resin concentrate. The concentrate was filtered and self-dispersed upon the addition of 5900 g of water. This novolak dispersion was used to make a metal treatment composition as described below.

A phenolic resole resin aqueous dispersion was made by mixing together 40 g of sodium salt of 6,7-dihydroxy-2-naphthalenesulfonate, 250 g of the HRJ11722 resole resin, and 50 g of water and steam heating for approximately 2 hours until the reaction mixture became very viscous and provided a transparent dispersion. 800 g of water was added to the resulting resin concentrate which then self-dispersed and was filtered. This resole dispersion was used to make an autodepositable primer as described below.

Aqueous metal treatment compositions according to the invention were prepared by mixing together at room temperature the following ingredients in the dry weight amounts in grams indicated in Table 1: the phenolic novolak resin aqueous dispersion described above (20% solids); aqueous solution phosphoric acid (5% solids); acrylonitrile-butadiene latex (available from B. F. Goodrich under the tradename HYCAR 1578X1, 50% solids); nitroguanidine ("NGD")(0.6% solids); sodium nitrobenzensulfonate ("NBS")(2.50% solids); and water. The amount of added water resulted in compositions having a total solids content of 6% or 8%.

Steel coupons (known as Q-Panels) were dipped in baths of the compositions at room temperature for 15 seconds (for both 6% and 8% total solids content). After immersion the treated coupons were immediately dried at 200° F. for 5 minutes. Immediately after drying the treated Q-panels were dipped for approximately 15 seconds in an autodepositable primer composition. The autodepositable primer composition was prepared by mixing together 18 g carbon black, 60 g zinc oxide, 75 g mica, 360 g aqueous phenolic resole resin dispersion, 540 g phenolic resole aqueous dispersion that incorporates a non-ionic protective colloid, presumably polyvinyl alcohol, (available from Georgia-Pacific under the trade designation GP 4000), 600 g dichlorobutadiene homopolymer latex and 2800 g water to form a composition having a solids content of 15%. The treated and primer-coated Q-panels then were dried at 200° F. and then subsequently baked for 15 minutes at 320° F. Autodeposited coatings had formed on all the panels.

The resulting panels were placed in a salt spray chamber in which the environment inside the chamber is 95° F., 100 percent relative humidity and 5 percent dissolved salt in the spray, which is dispersed as a fog continuously throughout the chamber. The panels were removed from the salt spray chamber after 300 hours and flexed on a ¼ inch mandrel. The crown of the flex was abraded by hand with SCOTCH-BRITE abrasive cleaning pads to determine the durability of the coating that had been subjected to the corrosive salt spray testing. The rating scale was as follows: 0-massive delamination on simple flexing, extending beyond flexed area; 1-delamination of flexed area only; 2-some delamination on flexing, abrasion removed remaining coating in flexed area; 3-cracking of the coating, coating readily removed on abrasion; 4-material could be abraded off but otherwise appeared to well-adhered; 5-coating was unaffected by flex and abrasion. The results are shown in Table 2.

TABLE 2

| Solids content | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|
| 6% | 4 | 4 | 5 | 4 | 5 | 5 | 2 | 1 | 2 |
| 6% | 5 | 5 | 5 | 5 | 5 | 3 | 2 | 1 | 2 |
| 8% | 5 | 5 | 4 | 0 | 2 | 5 | 0 | 0 | 0 |

EXAMPLES 15–17

Metal Treatment that Includes Control Agent

Aqueous metal treatment compositions according to the invention were prepared by mixing together at room temperature the ingredients in the g wet weight amounts shown

TABLE 1

| Ingredient | Ex. 6 | Ex. 7 | Ex. 8 | Ex. 9 | Ex. 10 | Ex. 11 | Ex.12 | Ex. 13 | Ex. 14 |
|---|---|---|---|---|---|---|---|---|---|
| Phenolic resin | 49.6 | 49.6 | 49.6 | 47.6 | 47.6 | 47.6 | 44.4 | 44.4 | 44.4 |
| Phosphoric acid | 23.7 | 23.7 | 23.7 | 23.7 | 23.7 | 23.7 | 23.7 | 23.7 | 23.7 |
| Latex | 23.7 | 23.7 | 23.7 | 23.7 | 23.7 | 23.7 | 23.7 | 23.7 | 23.7 |
| NGD | 1.00 | 0.75 | 0.50 | 1.67 | 1.25 | 0.83 | 2.73 | 2.05 | 1.36 |
| NBS | 2.00 | 2.25 | 2.50 | 3.33 | 3.75 | 4.17 | 5.47 | 6.15 | 6.84 | below in Table 3. The aqueous phenolic resin dispersion was the novolak dispersion described in connection with Examples 6–14.

TABLE 3

| Ingredient | Example 15 | Example 16 | Example 17 |
|---|---|---|---|
| Phenolic resin dispersion | 540 | 540 | 540 |
| Phosphoric acid | 540 | 540 | 540 |
| Water | 1425 | 1350 | 1050 |
| Acrylonitrile-butadiene latex (HYCAR 1578) | 108 | 108 | 108 |
| 2,4-Dinitrobenzene sulfonate (5% solids) | 228 | 0 | 0 |
| Naphthol Yellow S (5% solids) | 0 | 300 | 0 |
| Picric acid (1% solids) | 0 | 0 | 600 |

Q-panels were dipped in baths of these compositions for the amount of time and temperature shown in Table 4 ("RT" represents room temperature) and then subjected to drying at 200° F., except for the 15 second dip of Example 16 that was not dried. The treated panels then were immediately dipped in a bath of the autodepositable primer composition described in Examples 6–14 for approximately 10 seconds, dried at 200° F. and then baked for 15 minutes at 320° F. With respect to the one sample wherein the metal treatment was not dried, application of the primer was done on a wet surface. Autodeposited coatings had formed on each panel. The resulting panels then were subjected to the salt spray testing for 250, 500 and 750 hours. After removal from the salt spray chamber, the Q-panels were evaluated according to three tests. First, a portion of the panels was abraded by hand with a SCOTCHBRITE pad and the percentage amount of coating surface area that was unaffected was recorded. Second, a final portion of the panels was flexed on a 5/16 inch mandrel and then the crown of the flex was subjected to the pencil scratch test. The results of these tests are displayed in Table 4. With respect to the flex test, "very poor" is massive flaking, "poor" is visible flaking, "fair" is no flaking, but poor scratch on flexed areas.

Reichold Chemical Co. under the tradename TYLAC 97924; Example 19 was a chlorosulfonated polyethylene latex commercially available from Lord Corporation under the tradename HYP 605; and Example 20 was a chlorinated natural rubber latex.

Q-panels and degreased cold-rolled steel coupons were dipped for ten seconds in the metal treatment composition (8% solids) of each Example and then forced air dried at 200° F. The treated Q-panels and coupons then were immediately dipped for 10 seconds in the autodepositable primer described above in connection with Examples 6–14. The Q-panels and coupons then were dried for five minutes at 200° F. and then baked for 15 minutes at 320° F.

The resulting Q-panels were placed in the salt spray chamber for 250 hours. After removal from the salt spray chamber the Q-panels were abraded with SCOTCHBRITE pads and the percentage of coating not removed is indicated below in Table 5 under the heading "250 hrs SS". The Q-panels were also flexed on a 5/16 inch mandrel. The crown of the flex was abraded by hand with SCOTCHBRITE abrasive cleaning pads to determine the durability of the coating that had been subjected to the corrosive salt spray testing. The percentage of coating not removed across the flexed radius is indicated below in Table 5.

A commercially available aqueous adhesive covercoat (CHEMLOK®8282 available from Lord Corporation) was spray applied onto the treated and coated coupons only. The coupons then were prebaked for 5 minutes at 300° F. prior to bonding natural rubber for 16.5 minutes at 320° F. to the adhesive coated coupon via compression molding. The bonded coupons were tested for primary adhesion performance (according to ASTM 429B) as described above and the results are shown below in Table 5. The bonded coupons also were flexed over a 1 inch mandrel, the rubber was peeled back by hand and the percentage of rubber retained on the crown of the flex is indicated in Table 5.

TABLE 4

| Ex | Dip | 250 hr Abrasion | 250 hr Flex | 500 hr Abrasion | 500 hr Flex | 750 hr Abrasion | 750 hr Flex |
|---|---|---|---|---|---|---|---|
| 15 | 10" at RT | 100% | Excellent | 98% | Excellent | 96% | Fair |
| 15 | 5" at 50° C. | 100% | Poor | 95% | Fair | 99% | Fair |
| 16 | 10" at RT | 50% | NA | 10% | NA | 70% | Poor |
| 17 | 10" at RT | 99% | Poor | 100% | Poor | 98% | Poor |
| 15 | 15" at RT | 99% | Excellent | 98% | Good | 95% | Poor |

EXAMPLE 18–20

Metal Treatment with Various Flexibilizers

Aqueous metal treatment compositions according to the invention were prepared by mixing together at room temperature the following ingredients in g wet weight amounts: 360 g aqueous novolak dispersion described in connection with Examples 6–14; 360 g phosphoric acid; 950 g water; 152 g dinitrobenzene sulfonate (free acid); and 72 g flexibilizer. The flexibilizer in Example 18 was a styrene-butadiene rubber emulsion commercially available from

TABLE 5

| Example No. | 250 hrs SS | Q-panel flex | Coupon flex | Adhesion |
|---|---|---|---|---|
| 18 | 98% | 20% | 95% R | 100% R |
| 19 | 100% | 100% | 100% R | 100% R |
| 20 | 100% | 100% | 100% R | 100% R |

EXAMPLES 21–23

Metal Treatment with Novolaks Made from Different Modifying Agents 200 g of resorcinol, 20 g of pyrogallol, 12 g of phosphoric acid (855 aqueous solution) and 220 g of water were mixed together and heated to 95° C. When 95° C. was reached, 250 g of formalin (18.5% aqueous solution) was fed to the reaction mixture over a period of 30 minutes. Steam heating was continued for another 15 minutes at which point the mixture was slightly turbid and had a low viscosity (a sample precipitated out of solution upon dilution with water). 32 g of 2-formylbenzenesulfonic acid (sodium salt, 75% moist solid) and 40 more g of formalin then were added. After one hour and 15 minutes of steam heating the resin was very viscous. 580 g of water was added to the resin mixture and steam heating was continued until the resin was completely dispersible. Using essentially the same procedure 5-formyl-2-furan sulfonate and 1-diazo-2-naphthol-4-sulfonate stabilized (i.e., substituted for 2-formylbenzenesulfonic acid) resorcinol/pyrogallol novolak aqueous dispersions were prepared.

Three different metal treatment compositions (each containing one of the different novolak dispersions) were made by mixing together the following ingredients in wet weight amounts: 180 g dispersed novolak resin; 180 g phosphoric acid; 475 g water; 76 g dinitrobenzene sulfonate; and 36 g HYCAR latex. Q-panels were dipped into a bath of the metal treatment, dried for 3 minutes at 200° F., and then immediately dipped for ten seconds into a bath of the primer composition described in Examples 6–14. After removal from the primer bath, the Q-panels were dried at 200° F., and baked for fifteen minutes at 320° F. The resulting Q-panels had coatings varying in thickness from 0.90 to 1.06 mils indicating the formation of an autodeposited coating. The coated Q-panels were placed in the salt spray chamber for 250 and 500 hours, respectively. The Q-panel coatings were abraded with a SCOTCHBRITE pad and the percentage of coating not removed is indicated below in Table 6.

TABLE 6

| Example No. | Novolak Modifying Agent | 250 hr SS | 500 hr SS |
|---|---|---|---|
| 21 | 2-formylbenzenesulfonic acid | 98% | 97% |
| 22 | 5-formyl-2-furan sulfonate | 96% | 94% |
| 23 | 1-diazo-2-naphthol-4-sulfonate | 99% | 96% |

What is claimed is:

1. An aqueous metal surface treatment composition comprising the following ingredients:
   (A) an aqueous dispersion of a phenolic resin that includes a reaction product of
      (i) a phenolic resin precursor;
      (ii) a modifying agent, comprising a hydrocarbyl moiety bonded to at least one functional moiety that enables the modifying agent to react with the phenolic resin precursor; and at least one ionic moiety comprising an ionizable group containing sulfur or phosphorous,
      (iii) at least one multi-hydroxyphenolic compound; and
   (B) optionally an acid, wherein (iii) is optional in (A) when said reaction product (A) contains two or more reactive phenolic methylol groups.

2. The composition according to claim 1, wherein the ionizable group is selected from the group consisting of sulfonate (—S(O)$_2$H,) and salt (—S(O)$_2$O$^-$M$^+$), sulfinate (—S(O)OH) and salt (—S(O)O$^-$M$^+$), sulfenate (—SOH) and salt (—SO$^-$M$^+$), phosphono, —P(O)(OH)$_2$ and salts (—P(O)(OH)O$^-$M$^+$) and (—P(O)(O)$_2$$^{2-}$M$_1$$^+$M$_2$$^+$); phosphono ester (—P(O)(OH)(OR)) and salt (—P(O)(OR) O$^-$M$^+$); phosphonomethyl, (—CH$_2$P(O)(OH)$_2$) and salts (—CH$_2$P(O)(OH)O$^-$M$^+$) and (—CH$_2$P(O)(O)$_2$$^{2-}$M$_1$$^+$M$_2$$^+$); phosphino, (—P(O)(OH)) and salt (—(O)O$^-$M$^+$); and phosphinomethyl (—CH$_2$P(O)(OH)) and salt (—CH$_2$P(O)O$^-$M$^+$); wherein M$^+$ can be any monovalent cation.

3. The composition according to claim 1, wherein the ionic moiety somprises sulfur.

4. The composition of claim 1, wherein the ionic moiety comprises phosphorous.

5. The composition according to claim 1, wherein the modifying agent is an aliphatic modifying agent.

6. The compositoin of claim 1, wherein the modifying agent is an aliphatic modifying agent.

7. The composition of claim 5, wherein the ionic moiety comprises phosphorous.

8. An aqueous metal surface treatment composition comprising the following ingredients:
   (A) an aqueous dispersion of a phenolic resin that includes a reaction product of
      (i) a phenolic resin precursor;
      (ii) a modifying agent, comprising a hydrocarbyl moiety bonded to at least one functional moiety that enables the modifying agent to react with the phenolic resin precursor; and at least one ionic moiety comprising a sulfur;
      (iii) at least one multi-hydroxyphenolic compound; and
   (B) an acid wherein (iii) is optional in (A) when said reaction product (A) contains two or more reactive phenolic methylol groups.

9. The composition according to claim 8, wherein the hydrocarbyl moiety of said modifying agent is a substituted or unsubstituted C$_1$–C$_{20}$ aliphatic group.

10. The composition according to claim 8, wherein the modifying agent is

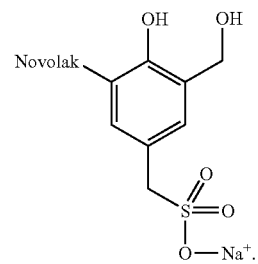

11. The composition according to claim 8, wherein the modifying is

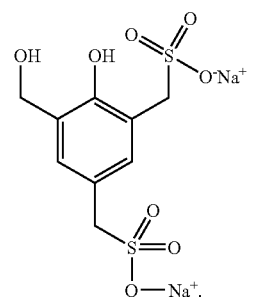

12. The composition according to claim 8, wherein the ionic moiety comprises a sulfinate (—S(O)OH).

13. The composition according to claim 8, wherein the ionic moiety comprises a sulfonate group represented by —S(O)$_2$OH or —S(O)$_2$O$^-$M$^{30}$, wherein M$^+$ represents a monovalent cation.

14. The composition according to claim 8, wherein the ionic moiety comprises a sulfinate (—S(O)O$^-$M$^+$), wherein M$^+$ represents a monovalent cation.

15. The composition according to claim 8, wherein the ionic moiety comprises a sulfenate group represented by —SOH or —SO$^-$M$^+$, wherein M$^+$ represents a monovalent cation.

16. The composition according to claim 8, wherein the modifying agent is

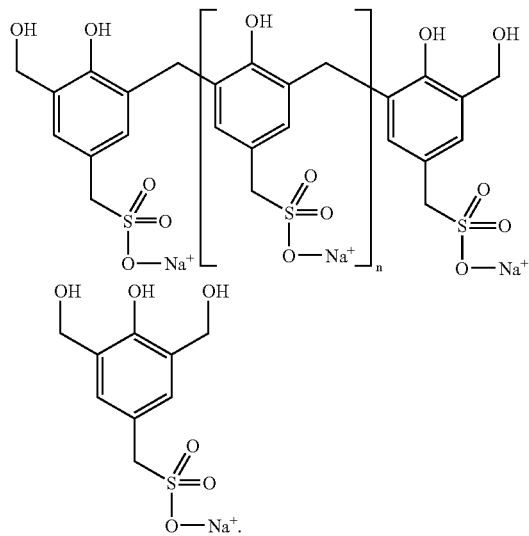

wherein n represents 1–500 repeating units.

17. The composition according to claim 8, wherein the ionic moiety comprises a sulfonomethyigroup represented by —CH$_2$S(O)$_2$OH or —CH$_2$S(O)$_2$O$^{-M+}$, wherein M$^+$ represents a monovalent cation.

18. The composition according to claim 8, wherein the reaction enabling moiety (a) is a formyl group.

19. The composition according to claim 8, wherein the modifying agent contains a nitrogen group.

20. The composition according to claim 19, wherein the nitrogen group is selected from the group consisting of an amide-, imine-, amine-, urea-, amidine-, guanidine-, semicarbazide-, hydrazide-, thiohydrazide-, thioamide-, thiourea-, thiosemicarbazide-, carbamate-, thiocarbamate-, dithiocarbamate-, and isothiourea-containing group.

21. The composition according to claim 8, wherein the modifying agent is an aliphatic formyl compound, and wherein the ionic moiety comprises a sulfonate group represented by —S(O)$_2$OH or —S(O)$_2$O$^-$M$^+$, wherein M$^+$ represents a monovalent ion.

22. The composition according to claim 8, wherein the modifying agent is a nitrogen-containing compound, and wherein the ionic moiety comprises a sulfonate group represented by —S(O)$_2$OH or —S(O)$_2$O$^-$M$^+$, wherein M$^+$ represents a monovalent ion.

23. The composition according to claim 8, wherein the modifying agent is selected from

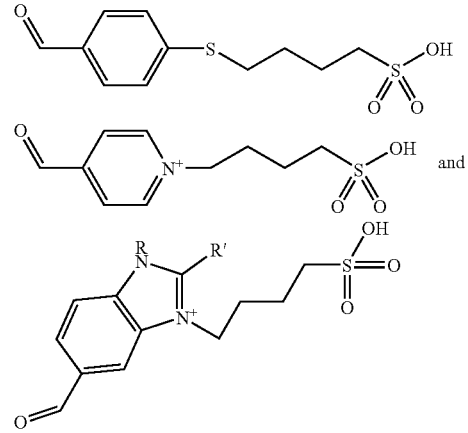

wherein R and R' are H or C$_1$–C$_{10}$ substituted or unsubstituted, linear or branch alkyl groups, C$_6$–C$_{30}$ aryl, and C$_6$–C$_{30}$ aryl substituted C$_1$–C$_{10}$ alkyl groups.

24. The composition according to claim 8, wherein the modifying agent is an oligomer of 2,6-bis-(hydroxymethyl)-4-sulfonomethyl-phenol.

25. The composition according to claim 8, wherein the modifying agent is a salt of 2,6-bis-(hydroxymethyl)-4-sulfonomethyl-phenol.

26. An aqueous metal surface treatment composition comprising the following ingredients:
(A) an aqueous dispersion of a phenolic resin that includes a reaction product of
  (i) a phenolic resin precursor;
  (ii) a modifying agent, wherein the modifying agent includes:
    (a) at least one functional moiety that enables the modifying agent to react with the phenolic resin precursor; and
    (b) at least one ionic moiety comprising phosphorous; and
  (iii) at least one multi-hydroxyphenolic compound; and optionally
(B) an acid, wherein (iii) is optional in (A) when said reaction product (A) contains two or more reactive phenolic methylol groups.

27. The composition according to claim 26, wherein the modifying agent contains a group selected from phosphono, —P(O)(OH)$_2$ and salts (—P(O)(OH)O$^-$M$^+$) and (—P(O)(O)$_2$$^{2-}$M$_1$$^+$M$_2$$^+$); phosphono ester (—P(O)(OH)(OR)) and salt (—P(O)(OR)O$^-$M$^+$); phosphonomethyl (—CH$_2$P(O)(OH)$_2$) and salts (—CH$_2$P(O)(OH)O$^-$M$^+$) and (—CH$_2$P(O)(O)$_2$$^{2-}$M$_1$$^+$M$_2$$^+$); phosphino, (—P(O)(OH)) and salt (—P(O)O$^-$M$^+$); and phosphinomethyl (—CH$_2$P(O)(OH)) and salt (—CH$_2$P(O)O$^-$M$^+$); wherein M$^+$ is any monovalent cation.

28. The composition according to claim 26, wherein the modifying agent is an aromatic modifying agent.

29. The composition according to claim 26, wherein the modifying agent is a phosphonomethylated phenolic.

30. The composition according to claim 26, wherein the ionic moiety comprises a phosphono group represented by —P(O)O$_2$$^{2-}$M$_1$$^+$M$_2$$^+$, wherein M$_1$$^+$ and M$_2$$^+$ each and independently represent monovalent cations.

31. The composition according to claim 26, wherein the ionic moiety comprises a phosphono ester group represented by —P(O)(OR)OH or —P(O)(OR)O$^-$M$^+$, wherein M$^{30}$ represents a monovalent ion and R represents an organic radical.

32. The composition according to claim 26, wherein the ionic moiety comprises a phosphino group represented by —P(O)OH or —P(O)O$^-$M, wherein M$^+$ represents a monovalent cation.

33. The composition according to claim 26, wherein the ionic moiety comprises a phosphonomethyl group represented by —CH$_2$P(O)O$_2^{2-}$M$_1^+$M$_2^+$, wherein M$_1^+$ and M$_2^+$ each and independently represent monovalent cations.

34. The composition according to claim 26, wherein the ionic moiety comprises a phosphonomethyl group represented by —CH$_2$P(O)(OR)O$^-$M$^+$ wherein M$^+$ represents a monovalent ion and R represents an organic group.

35. The composition according to claim 26, wherein the ionic moiety comprises a phosphinomethyl group represented by —CH$_2$P(O)O$^-$M, wherein M$^+$ represents a monovalent ion.

36. The composition according to claim 26, wherein the ionic moiety comprises a phosphate group represented by —OP(O)O$_2^{2-}$M$_1^+$M$_2^+$, wherein M$_1^+$ and M$_2^+$ each and independently represent monovalent ions.

37. The composition according to claim 26, wherein the ionic moiety comprises a esterified phosphate group represented by —OP(O)(OR)O$^-$M$^+$, wherein M$^+$ represents a monovalent ion and R represents an organic group.

38. The composition according to claim 26, wherein the reaction enabling moiety is a formyl group and the ionic moiety comprises a phosphono group represented by —P(O)$_2^{2-}$M$_1^+$M$_2^+$, wherein M$_1^+$ and M$_2^+$ each and independently represent monovalent ions.

39. The composition according to claim 26, wherein the reaction enabling moiety is a formyl group and the ionic moiety comprises a phosphino group represented by —P(O)O$^-$M$^+$, wherein M$^+$ represents a monovalent ion.

40. The composition according to claim 26, wherein the modifying agent is a nitrogen-containing compound, and the ionic moiety comprises a phosphono group represented by —P(O)O$_2^{2-}$M$_1^+$M$_2^+$, wherein M$_1^+$ and M$_2^+$ each and independently represent monovalent ions.

41. The composition according to claim 26, wherein the modifying agent is a nitrogen-containing compound, and the ionic moiety comprises a phosphino group represented by —P(O)O$^-$M$^+$, wherein M$^+$ represents a monovalent ion.

42. The composition according to claim 26, wherein the modifying agent is selected from

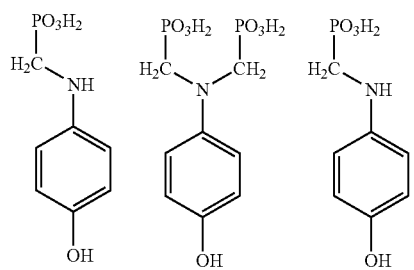

-continued

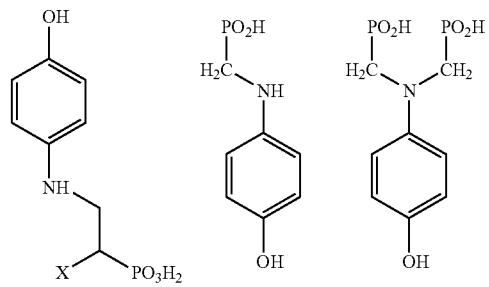

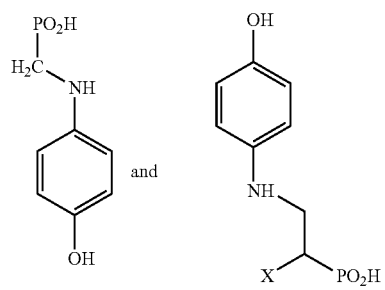

wherein X is H or PO$_3$H$_2$.

43. The composition according to claim 26, wherein the modifying agent is

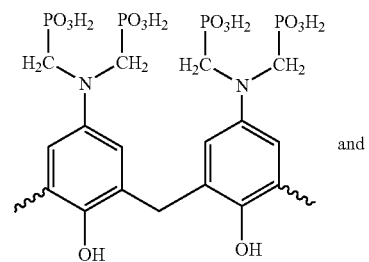

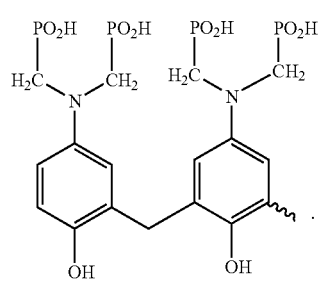

44. The composition according to claim 26, wherein the modifying agent is

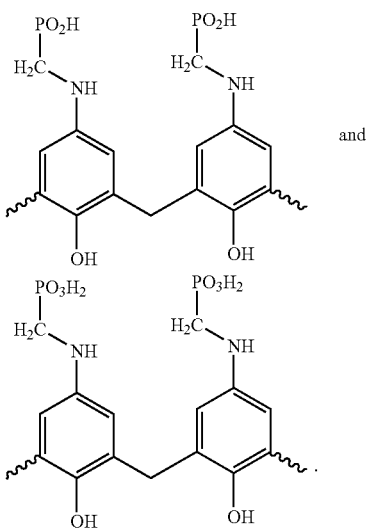 and

45. An aqueous metal surface treatment composition comprising the following ingredients:
(A) an aqueous dispersion of a phenolic resin that includes a reaction product of
(i) a phenolic resin precursor;
(ii) a modifying agent, wherein the modifying agent includes:
(a) at least one functional moiety that enables the modifying agent to react with the phenolic resin precursor; and
(b) at least one ionic moiety comprising an activated carboxylate; and
(iii) at least one multi-hydroxyphenolic compound; and
(B) an acid.

46. The composition according to claim 45, wherein the reaction enabling moiety is a formyl group.

47. The composition according to claim 45, wherein the modifying agent is an aliphatic modifying agent.

48. The composition according to claim 45, wherein the modifying agent is an aromatic modifying agent.

49. The composition according to claim 45, wherein the ionic moiety is an α,α-difluorocarboxylate moiety.

50. The composition according to claim 48, wherein the ionic moiety is an α,α-difluorocarboxylate moiety.

51. An aqueous metal surface treatment comprising the following ingredients:

an aqueous dispersion of a phosphorous-modified novolak resin which is a chain extended ionic-modified novolak advanced in molecular weight to just below the gel point; and an acid in an amount sufficient to react with a metal surface being treated to generate multivalent ions in an amount sufficient for autodeposition.

52. An aqueous autodeposition composition comprising the following ingredients:

an autodepositable phosphorous-modified novolak resin which is a chain extended ionic modified novolak advanced in molecular weight to just below the gel point; and an acid in an amount sufficient to react with a metal surface being treated to generate multivalent ions in an amount sufficient for autodeposition.

53. An aqueous autodeposition composition comprising the following ingredients:

an autodepositable novolak resin modified by reaction of a phenolic precursor and an activated carboxylic acid containing a phenolic reactive group; and an acid in an amount sufficient to react with a metal surface being treated to generate multivalent ions in an amount sufficient for autodeposition.

54. The composition of claim 53 wherein said activated carboxylic acid is a mixture of

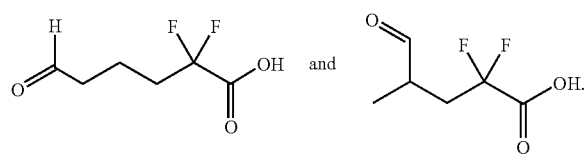

55. The composition of claim 53 wherein said activated carboxylic acid is

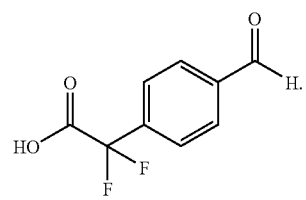

* * * * *